(12) United States Patent
Horiuchi et al.

(10) Patent No.: US 8,737,288 B2
(45) Date of Patent: May 27, 2014

(54) WIRELESS COMMUNICATION APPARATUS AND WIRELESS COMMUNICATION METHOD

(75) Inventors: Ayako Horiuchi, Kanagawa (JP); Seigo Nakao, Kanagawa (JP); Akihiko Nishio, Kanagawa (JP); Yasuaki Yuda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 92 days.

(21) Appl. No.: 13/496,738

(22) PCT Filed: Sep. 29, 2010

(86) PCT No.: PCT/JP2010/005877
§ 371 (c)(1),
(2), (4) Date: Mar. 16, 2012

(87) PCT Pub. No.: WO2011/040024
PCT Pub. Date: Apr. 7, 2011

(65) Prior Publication Data
US 2012/0176961 A1 Jul. 12, 2012

(30) Foreign Application Priority Data

Oct. 2, 2009 (JP) ................................. 2009-230958

(51) Int. Cl.
*H04B 7/14* (2006.01)
(52) U.S. Cl.
USPC .......................................................... 370/315
(58) Field of Classification Search
None
See application file for complete search history.

(56) References Cited

U.S. PATENT DOCUMENTS

| | | | |
|---|---|---|---|
| 7,894,330 B2 | 2/2011 | Lee et al. | |
| 2009/0274037 A1 | 11/2009 | Lee et al. | |
| 2010/0048151 A1 | 2/2010 | Hara | |
| 2010/0054161 A1* | 3/2010 | Montojo et al. | 370/280 |
| 2010/0195583 A1* | 8/2010 | Nory et al. | 370/329 |
| 2010/0197302 A1* | 8/2010 | Chen et al. | 455/434 |
| 2010/0260036 A1* | 10/2010 | Molnar et al. | 370/203 |
| 2011/0116456 A1* | 5/2011 | Gaal et al. | 370/329 |
| 2011/0122825 A1* | 5/2011 | Lee et al. | 370/328 |
| 2011/0179331 A1 | 7/2011 | Lee et al. | |
| 2012/0114021 A1* | 5/2012 | Chung et al. | 375/211 |
| 2013/0028238 A1* | 1/2013 | Kim et al. | 370/336 |

FOREIGN PATENT DOCUMENTS

WO 2008/099785 A1 8/2008
WO 2009/104880 A1 8/2009

OTHER PUBLICATIONS

3GPP TR 36.814 V1.2.1 (Jun. 2009), "Further Advancements for E-UTRA Physical Layer Aspects", (Release 9).
R1-081522 TSG-RAN WG1 #52bis, Ericsson, "Summary of email discussion on DL control signaling", Mar. 31, 2008.

(Continued)

*Primary Examiner* — Hassan Kizou
*Assistant Examiner* — Gustavo Lopez-Vargas
(74) *Attorney, Agent, or Firm* — Pearne & Gordon LLP

(57) ABSTRACT

To effectively use transmission power by changing the arrangement of unused REGs. A wireless communication apparatus according to the invention corresponds to a wireless communication apparatus for performing wireless communication with a terminal equipment via a relay station, which includes an allocator which allocates CCEs in which control signals for the relay station are arranged to a plurality of REGs so that unused REGs not allocated with the CCEs differ among respective resource blocks each having the plurality of REGs, and a transmitter which transmits the control signals arranged in the CCEs allocated to the REGs to the relay station in accordance with an allocation by the allocation section.

5 Claims, 18 Drawing Sheets

(56) References Cited

OTHER PUBLICATIONS

R1-091806, 3GPP TSG RAN WG1 meeting #57, Huawei, "Interference mitigation for control channels and signals of type 1 relays", May 4, 2009.

R1-083856, 3GPP TSG RAN WG1 #54bis, Nortel, "on PDCCH mapping randomization", Sep. 29, 2008.

International Search Report for PCT/JP2010/005877 dated Oct. 26, 2010.

* cited by examiner

WIRELESS COMMUNICATION APPARATUS AND WIRELESS COMMUNICATION METHOD

TECHNICAL FIELD

The present invention relates to a wireless communication apparatus and a wireless communication method.

BACKGROUND ART

In recent years, in the cellular mobile communication system, a transmission of large capacity data such as still image data and motion image data as well as audio data has become generalized in accordance with the expansion of multimedia of information. In order to realize the transmission of large capacity data, a technique for realizing the high transmission rate utilizing a high-frequency radio band has been investigated flourishingly.

At the time of utilizing the high-frequency radio band, however, although the high transmission rate can be expected at a short distance, an amount of attenuation due to the transmission distance increases in accordance with the increase of the distance. Thus, in the case of actually employing the mobile communication system utilizing the high-frequency radio band, the coverage area of a wireless communication base station apparatus (Evolved NodeB: eNB, hereinafter referred to as a base station) becomes small. Therefore, it becomes necessary to install a lot of base stations. Since it takes a correspondence cost at the time of installing the base station, a technique has been demanded strongly which can realize the communication service utilizing the high-frequency radio band while suppressing the increase of the number of the base stations.

According to the aforesaid demand, in order to enlarge the coverage area of each of the base stations, the investigation has been made as to a relay transmission technique in which, as shown by a wireless relay system of a related art shown in FIG. 15, a wireless communication relay station apparatus (hereinafter referred to as a relay station) 30 is provided between a base station 10 and a wireless communication terminal apparatus (User Equipment: UE, hereinafter referred to as a terminal) 50B to thereby perform communication between the base station 10 and the terminal 50B via the relay station 30. By employing the relaying technique, the terminal 50B, that can not directly perform the communication with the base station 10, can perform the communication via the relay station 30. A terminal 50A is connected to the base station 10 and hence can directly perform the communication with the base station 10.

[Explanation of TD Relay]

The TD relay is a system for dividing communication in a backhaul link and an access link in a time-sharing manner. According to the TD relay, the relay station can perform reception via the backhaul link and transmission via the access link without being influenced by unintended loopback between the transmission antenna and the reception antenna of the relay station. When the TD relay is applied, however, there arises a period during which the relay station stops the transmission to the access link in the backhaul downlink. The LTE (Long Term Evolution; hereinafter referred to as LTE) terminal operates on the assumption that the base station periodically transmits a reference signal via the downlink. Thus, when the relay station stops the transmission of data including the reference signal and the like in a subframe, there arises a problem that the terminal erroneously detects the reference signal.

[Utilization of MBSFN Subframe]

The LTE-A (Long Term Evolution Advanced) system is required to maintain the compatibility with the LTE in view of the smooth transition from the LTE and the coexistence with the LTE. Thus, this system is required to attain the mutual compatibility with the LTE also as to the Relay technique. In the LTE-A system, in order to attain the mutual compatibility with the LTE, it has been investigated to set an MBSFN subframe at the time of transmission to the relay station from the base station in a downlink (hereinafter referred to DL).

The "MBSFN subframe" is a subframe defined in order to transmit MBMS (Multimedia Broadcast Multicast Service) data. The LTE terminal is defined in its operation so as not to use the reference signal in the MBSFN subframe.

Thus, in the LTE-A, there has been proposed a method that, in a subframe for the backhaul link where the relay station 30 performs the communication with the base station 10, the subframe on the access link side of an RN (relay station) cell is set to the MBSFN subframe to thereby avoid the erroneous detection of the reference signal at the LTE terminal. FIG. 16 shows an example of the allocation of a control signal and data in the subframe in each of the respective stations in the LTE system. As shown in FIG. 16, in the LTE system, the control signal is arranged at the head of the subframe in each of the respective stations. Thus, since the relay station 30 must transmit the control signal portion to the terminal 50B even in the MBSFN subframe, the relay station 30 changes its mode into a reception mode after transmitting the control signal to the terminal 50B and receives the signal from the base station 10. Accordingly, the relay station 30 can not receive the control signal transmitted from the base station 10. As a result, in the LTE-A, it has been investigated to newly arrange the control signal for the relay station 30 into the data area.

[Explanation of Control Signal]

The control signal of the LTE system is transmitted to the terminal from the base station by using a downlink control channel such as a PDCCH (Physical Downlink Control Channel). Each of the PDCCHs is arranged in one or plural CCEs (Control Channel Elements), that is, logical resource.

In the case where one PDCCH is arranged in one or plural CCEs, the one PDCCH is arranged in continuous plural CCEs.

The CCEs where the respective PDCCHs are arranged are mapped on corresponding REGs (Resource Element Groups) as physical resources. The one CCE is mapped on 9 REGs. The REG is configured by 4 REs. The RE represents a resource unit of (1 subcarrier*1 OFDM symbol).

[Example of RB for Control Signal for Relay Station (R-PDCCH) (4 Antennas)]

Explanation will be made as to an example (4 antennas) of the resource block (hereinafter referred to RB) for the control signal for the relay station with reference to FIG. 17. It is supposed that 1 RB is configured by (12 subcarriers×14 OFDMs). A block of minimum unit drawn by a (thin) solid line in FIG. 17 represents 1 RE. A block drawn by a (thick) solid line in FIG. 17 represents 1 REG (configured by 4 REs). Of the blocks of the minimum unit drawn by the (thin) solid lines in FIG. 17, the block shown by Rn (n=0 to 3) represents the RS of the n-th antenna n. It is supposed that 1 CCE is configured by 9 REGs.

In the example of 1 resource block (RB) shown in FIG. 17, since 1 RB is configured by (12 subcarriers×14 OFDMs), 168 REs can be arranged per 1 RB. Further, as shown in FIG. 17, when 24 REs are used for the transmission of the RSs (R0, R1, R2, R3) and the latter 11 OFDM symbols are used for the R-PDCCH, 116 REs can be used for the R-PDCC.

Like the LTE, in the 1 resource block (RB) shown in FIG. 17, since the 1 REG is configured by 4 REs, 29 REGs can be used for the R-PDCCH. Further, in the 1 resource block (RB) shown in FIG. 17, since the 1 CCE is configured by the 9 REGs, 3 CCEs (9*3=27 REGs) can be allocated for the 1 RB. Thus, there are two unused REGs obtained by subtracting 27 REGs from 29 REGs usable as the R-PDCC.

CITATION LIST

Non-Patent Literature

Non-Patent Literature 1: 3GPP TR 36.814 V1.2.1

SUMMARY OF INVENTION

Technical Problem

In the LTE, however, according to its rule, the REGs used for the PDCCH are sequentially numbered in the order of one having a smaller subcarrier No. of the RE belonging to the REG and having a smaller OFDM symbol. In this case, when the number of the REGs used for the PDCCH is not divided by 9, there arises REG(s) not being used. Then, each of the REG(s) not being used is arranged at a location having a large subcarrier No. and a large OFDM symbol. When the aforesaid rule is also applied to the control signal for the relay station, each of the REG(s) not being used is arranged at a location having a large subcarrier No. and a large OFDM symbol.

FIG. 18 shows an example of a plurality of resource blocks (RBs). As well as FIG. 17, it is supposed that 1 RB is configured by (12 subcarriers×14 OFDMs) in FIG. 18. Further, a block of minimum unit drawn by a (thin) solid line in FIG. 18 represents 1 RE. A block of minimum unit drawn by a (thick) solid line in FIG. 18 represents 1 REG (configured by 4 REs). Of the blocks of the minimum unit drawn by the (thin) solid lines in FIG. 18, the block shown by Rn (n=0 to 3) represents the RS of the n-th antenna n. It is supposed that 1 CCE is configured by 9 REGs.

As shown in FIG. 18, the REGs (portions represented by slanted lines) not being used are 28-th and 29-th REGs. It has also been investigated that the R-PDCCH may be configured that different RBs are arranged for the respective relay stations. In this case, in the example shown in FIG. 18, for example, the RBs can be allocated so that the R-PDCCH for a relay station (RN1) is transmitted in the RB#1 and the R-PDCCH for another relay station (RN2) is transmitted in the RB#5. In this case, the REGs arranged at the same OFDM symbol are not used in the respective resource blocks (RBs). Thus, there arises a problem that the transmission power of the base station can not be used effectively.

The aforesaid problem relating to the transmission power will be explained in detail. The transmission power of the base station is determined by the total amount of the transmission power of all subcarriers. Thus, it is possible for the base station to use the transmission power of a subcarrier not being used for another subcarrier. When the transmission power of the data signal changes, however, for every symbol, since the base station uses the amplification amount of a signal as information at the time of performing multilevel modulation, the amplification amount of the signal fluctuates. Therefore, it is difficult that the transmission power of a subcarrier not being used is used for only a part of the OFDM symbols.

Thus, in the resource blocks (RBs) shown in FIG. 18, when the REGs of the OFDM symbols #13 and #14 are not used, there arises a margin in the transmission power of the OFDM symbols #13 and #14 at the base station. However, the base station can not raise the transmission power of only the OFDM symbols #13 and #14 of the data arranged in the subcarrier of other resource block (RB), remaining power of the transmission power of the OFDM symbols #13 and #14 can not be used effectively.

An object of this invention is to provide a wireless communication apparatus and a wireless communication method which can effectively use transmission power by changing the arrangement of REGs not being used.

Solution to Problem

As an embodiment of the invention, there is provided a wireless communication apparatus which performs wireless communication with a terminal equipment via a relay station, the wireless communication apparatus including: an allocator which is adapted to allocate CCEs in which control signals for the relay station are arranged to a plurality of REGs so that unused REGs not allocated with the CCEs differ among respective resource blocks each having the plurality of REGs; and a transmitter which is adapted to transmit the control signal arranged in the CCEs allocated to the REGs to the relay station in accordance with an allocation by the allocator.

The wireless communication apparatus is configured so that the allocator is adapted to allocate the CCEs to the REGs so that an index of REG for starting the allocation of the CCEs is cyclically shifted at each of the resource blocks.

The wireless communication apparatus is configured so that an amount of shift for cyclically shifting the unused REGs is determined in the allocator so as to be a numerical value which is obtained by multiplying a number of the unused REGs by a remainder that is obtained by dividing a No. of the resource block by the number of the REGs of one resource block.

The wireless communication apparatus is configured so that the allocator is adapted to cyclically shift the unused REGs at each of resource block sets when the CCEs are allocated to the resource block sets each configured by at least a part of the resource blocks.

The wireless communication apparatus is configured so that the allocator is adapted to cyclically shift the unused REGs at each of the resource blocks when the CCEs are allocated to resource block sets each configured by at least a part of the resource blocks.

The wireless communication apparatus is configured so that the allocator is adapted to cyclically shift REG containing a determined subcarrier as the unused REGs at each of the resource blocks.

As an embodiment of the invention, there is provided a wireless communication method for performing wireless communication with a terminal equipment via a relay station, the wireless communication method including the steps of allocating CCEs in which control signals for the relay station are arranged to a plurality of REGs so that unused REGs not allocated with the CCEs differ among respective resource blocks each having the plurality of REGs; and transmitting the control signal arranged in the CCEs allocated to the REGs to the relay station in accordance with the allocation.

Advantageous Effects of Invention

According to the wireless communication apparatus and the wireless communication method of the invention, the transmission power can be used effectively by changing the arrangement of the unused REGs.

MODES FOR CARRYING OUT INVENTION

Hereinafter, embodiments of the invention will be explained with reference to drawings.

First Embodiment

Figure 1:
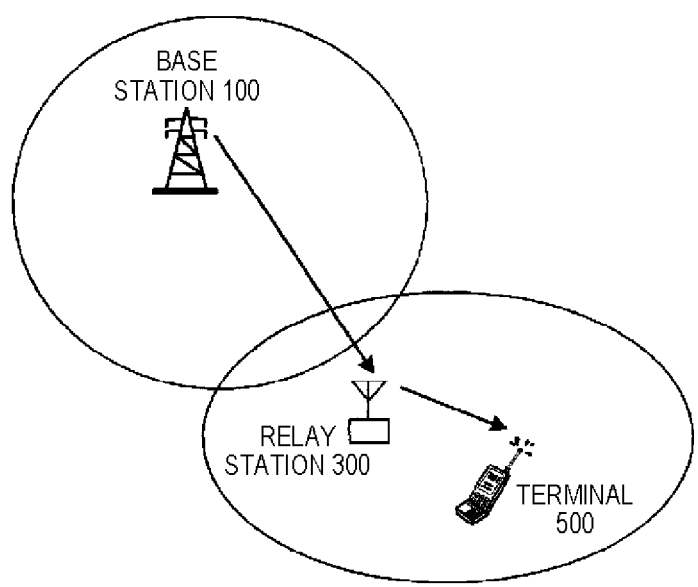
FIG. 1 is a diagram showing the configuration of a wireless communication system according to a first embodiment.

Explanation will be made with reference to FIG. 1 as to a wireless communication system according to a first embodiment which relays a wireless signal by using the Relay technique. FIG. 1 is a diagram showing the configuration of the wireless communication system according to the first embodiment. In the wireless communication system according to the first embodiment, a wireless communication relay station apparatus (hereinafter referred to as a relay station) 300 is provided between a base station 100 and a wireless communication terminal equipment (User Equipment: UE, hereinafter referred to terminal) 500 to thereby perform communication between the base station 100 and the terminal 500 via the relay station 300. By employing the relaying technique, the terminal 500 that can not directly perform the communication with the base station 100 can perform the communication therewith via the relay station 300.

The relay of the wireless communication system according to this embodiment employs the time-division relay (TD relay) and the route thereof has two hops from the base station 100 to the terminal 500 via the relay station 300.

In the wireless communication system according to this embodiment, when there are plural resource blocks (RBs), each of the resource blocks is represented by "resource block RB#n (n: 0 or natural number)" in order to distinguish the respective resource blocks.

In the wireless communication system according to this embodiment, the aforesaid rule of the LTE, that is, "the REGs used for the PDCCH are sequentially numbered in the order of one having a smaller subcarrier No. of the RE belonging to the REG and having a smaller OFDM symbol" is applied to the control signal (R-PDCCH) for the relay station. Hereinafter, an n-th (n: 0 or natural number) REG is represented by "REG#n".

In the wireless communication system according to this embodiment, the base station 100 cyclically shifts the arrangement of the REGs#n not being used for the control signal (R-PDCCH) for the relay station at every resource block RB#n so that the REGs#n not used for the control signal (R-PDCCH) for the relay station differ at every resource block RB#n. In other words, the base station 100 cyclically shifts, at every resource block RB#n, the positions of the REGs#n not allocated with the CCE for mapping the control signal R-PDCCH for the relay station in each of the resource blocks RBs#n. Hereinafter, arrangement examples 1 to 5 of the REGs#n in this embodiment will be explained.

Arrangement Example 1 of REGS#n

Figure 2:
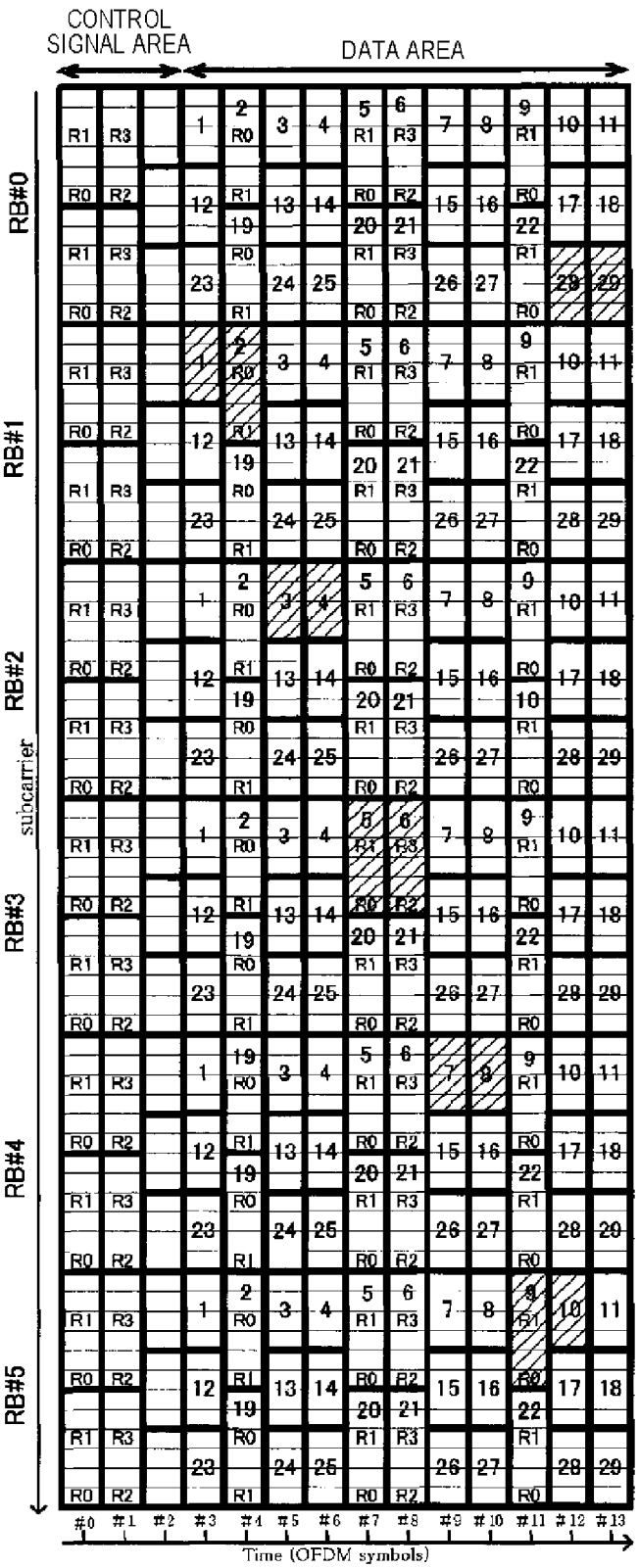
FIG. 2 is a diagram showing an arrangement example 1 of REGs.

FIG. 2 shows an arrangement example 1 of the REGs#n in the plural resource blocks RB#0 to RB#5.

Figure 17:
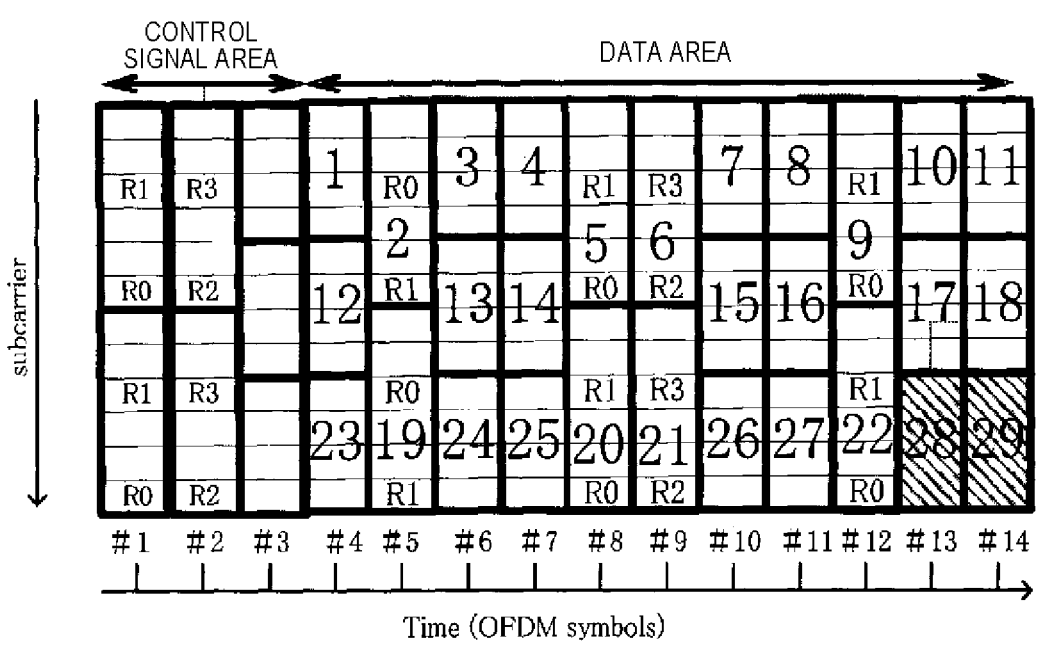
FIG. 17 is a diagram showing an example an RB for a control signal for a relay station (in a case of 4 antennas).
Figure 18:
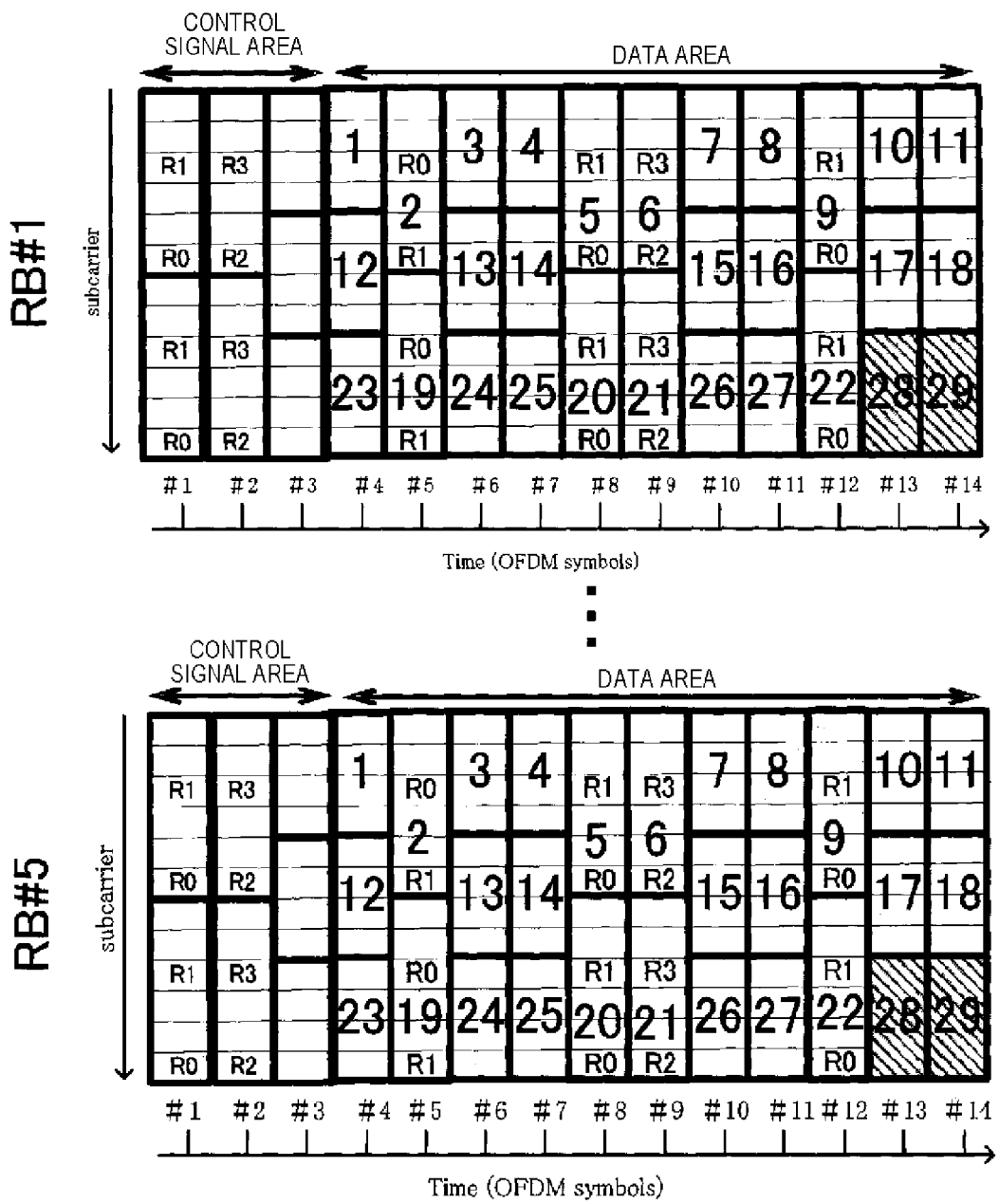
FIG. 18 is a diagram showing an example plural RBs for the control signal for a relay station (in a case of 4 antennas).

In FIG. 2, a block of minimum unit surrounded by a (thin) solid line represents 1 RE. A block drawn by a (thick) solid line in FIG. 17 represents 1 REG (configured by 4 REs).

Of the blocks representing REs in FIG. 2, the block shown by Rn (n=0 to 3) represents the RS of the n-th antenna n. Further, 1 CCE is configured by 9 REGs.

The plural resource blocks RB#0 to RB#5 shown in FIG. 2 are resource blocks (4 antennas) for the control signal (R-PDCCH) for the relay station. In the plural resource blocks RB#0 to RB#5, 1 RB is configured by (12 subcarriers×14 OFDMs). Thus, 168 REs can be arranged for 1 RB.

Further, in the plural resource blocks RB#0 to RB#5 shown in FIG. 2, the base station 100 uses 24 REs for the transmission of RSs (R0, R1, R2, R3) and uses latter 11 OFDM symbols as the R-PDCCH. Thus, the base station 100 can use 116 REs for the R-PDCCH.

Further, in the plural resource blocks RB#0 to RB#5 shown in FIG. 2, 1 REG is configured by 4 REs as in the LTE. Thus, the base station 100 can use 29 REGs for the R-PDCCH.

Furthermore, in the plural resource blocks RB#0 to RB#5 shown in FIG. 2, 1 CCE is configured by 9 REGs. Thus, the base station 100 can allocate 3 CCEs (9*3=27 REGs) to 1 RB in each of the resource blocks RB#0 to RB#5.

In each of the resource blocks RB#0 to RB#5 configured in the aforesaid manner, two REGs, obtained by subtracting 27 REGs constituting 3 CCEs from 29 REGs usable as the R-PDCCH, exist each as REG#n not used as the R-PDCCH. In other words, in FIG. 2, in each of the resource blocks RBs#n, there exist two REGs#n to each of which the CCE for mapping the control signal R-PDCCH for the relay station is not allocated.

In FIG. 2, each of the blocks REGs#n not used as the R-PDCCH is represented as a block surrounded by slanted lines.

Hereinafter, in each of the resource blocks RBs#n, REG#n not used as the n-th R-PDCCH is represented by "unused REG#n". The unused REG#n is not allocated with the CCE for mapping the control signal R-PDCCH for the relay station.

The explanation will be made as to the arrangement of the unused REG#n with respect to each of the resource blocks RBs#n with reference to FIG. 2.

As shown in FIG. 2, there are the unused REG#28 and the unused REG#29 in the resource block RB#0, whilst there are the unused REG#1 and the unused REG#2 in the resource block RB#1.

Further, as shown in FIG. 2, there are the unused REG#3 and the unused REG#4 in the resource block RB#2, whilst there are the unused REG#5 and the unused REG#6 in the resource block RB#3. Furthermore, there are the unused REG#7 and the unused REG#8 in the resource block RB#4, whilst there are the unused REG#9 and the unused REG#10 in the resource block RB#5.

As explained above, in the plural resource blocks RB#0 to RB#5 shown in FIG. 2, when the base station 100 changes the arrangement of the unused REGs#n at every resource block RB#n, the OFDM symbols where the unused REGs#n are arranged can be dispersed. Explanation will be made later as to the method of determining the No. n of the unused REGs#n.

The arrangement of the unused REGs#n with respect to the OFDM symbol #n (n=0 to 13) will be explained with reference to FIG. 2.

As shown in FIG. 2, in the resource block RB#0, the base station 100 does not transmit a part (slanted portion in FIG. 2) of the OFDM symbol #12 constituted by the REG#10, REG#17, REG#28 and a part (slanted portion in FIG. 2) of the OFDM symbol #13 constituted by the REG#11, REG#18, REG#29 of each of the resource blocks #n.

In the resource block RB#1, the base station 100 does not transmit a part (slanted portion in FIG. 2) of the OFDM symbol #3 constituted by the REG#1, REG#12, REG#23 and a part (slanted portion in FIG. 2) of the OFDM symbol #4 constituted by the REG#2, REG#19 of each of the resource blocks #n.

In the resource block RB#2, the base station 100 does not transmit a part (slanted portion in FIG. 2) of the OFDM symbol #5 constituted by the REG#3, REG#13, REG#24 and a part (slanted portion in FIG. 2) of the OFDM symbol #6 constituted by the REG#4, REG#14, REG#25 of each of the resource blocks #n.

In the resource block RB#3, the base station 100 does not transmit a part (slanted portion in FIG. 2) of the OFDM symbol #7 constituted by the REG#5, REG#20 and a part (slanted portion in FIG. 2) of the OFDM symbol #8 constituted by the REG#6, REG#21 of each of the resource blocks #n.

In the resource block RB#4, the base station 100 does not transmit a part (slanted portion in FIG. 2) of the OFDM symbol #9 constituted by the REG#7, REG#15, REG#26 and a part (slanted portion in FIG. 2) of the OFDM symbol #10 constituted by the REG#8, REG#16, REG#27 of each of the resource blocks #n.

In the resource block RB#5, the base station 100 does not transmit a part (slanted portion in FIG. 2) of the OFDM symbol #11 constituted by the REG#9, REG#22 and a part (slanted portion in FIG. 2) of the OFDM symbol #12 constituted by the REG#10, REG#17, REG#28 of each of the resource blocks #n.

As described above, in the data area, there exists the unused REG#n in each of the OFDM symbol #3 to the OFDM symbol #13. Thus, the base station 100 can distribute the transmission power of these unused REGs to the transmission of the R-PDCCH or the transmission of the data. When the transmission power can be distributed in this manner, the power utilization efficiency can be improved and the data error rate characteristics can be improved in the base station 100. Further, the base station 100 can reduce the difference of the transmission power between the respective OFDM symbols #n by distributing the OFDM symbols #n of the unused REGs#n. Thus, the operation of the PA (power amplifier) can be stabilized advantageously.

Next, the explanation will be made as to the method of determining the arrangement of the unused REGs#n in the arrangement example 1 of the REGs shown in FIG. 2.

First, in order to set the unused REGs#n, the number of the CCEs per 1 RB is obtained from (the number of the REGs usable for the R-PDCCH/9). Then, the number of the unused REGs#n per 1 RB is obtained from (the number of the REGs usable for the R-PDCCH mod 9).

The number of the REGs#n usable for the R-PDCCH varies depending on the number of the antennas Rn which changes the number of the RSs. Further, the number of the OFDM symbols used for the R-PDCCH varies depending on the number of other control signals to be transmitted in the same resource block RB.

Then, the shift amount S of the unused REG#n is determined based on the following (expression 1). The (expression 1) is the information commonly possessed by the base station 100 and the relay station 300, and each of the base station 100 and the relay station 300 performs the calculation commonly.

[Numeral 1]

$$(\text{RB No.}) \bmod (\text{number of REGs per 1 RB}) * \text{remaining number of REGs} \quad \text{(expression 1)}$$

The RB No. represents the No. n of the resource block RB#n. Further, the number of REGs per 1 RB represents the number of the REGs#n usable in each of the resource blocks RBs#n. The remaining number of the REGs represents the number of the unused REGs#n in each of the resource blocks RBs#n.

For example, when 2, 29 and 2 are assigned to the RB No., the (number of REGs per 1 RB) and the remaining number of REGs in the (expression 1), respectively, the shift amount S of the unused REG#n is obtained as (2 mod 29)*2=4. This means that the position of the unused REG#n is cyclically shifted by 4. Thus, if the positions of the unused REGs#28, #29 of the resource block RB#0 are determined as the references in FIG. 2, the positions of the unused REGs#28, #29 are cyclically shifted by the shift amount 4 in the resource block RB#2 where the RB No. is 2. Thus, the unused REGs#n are determined as the unused REGs#3, #4 in the resource block RB#2.

Arrangement Example 2 of REGS#n

Figure 3:
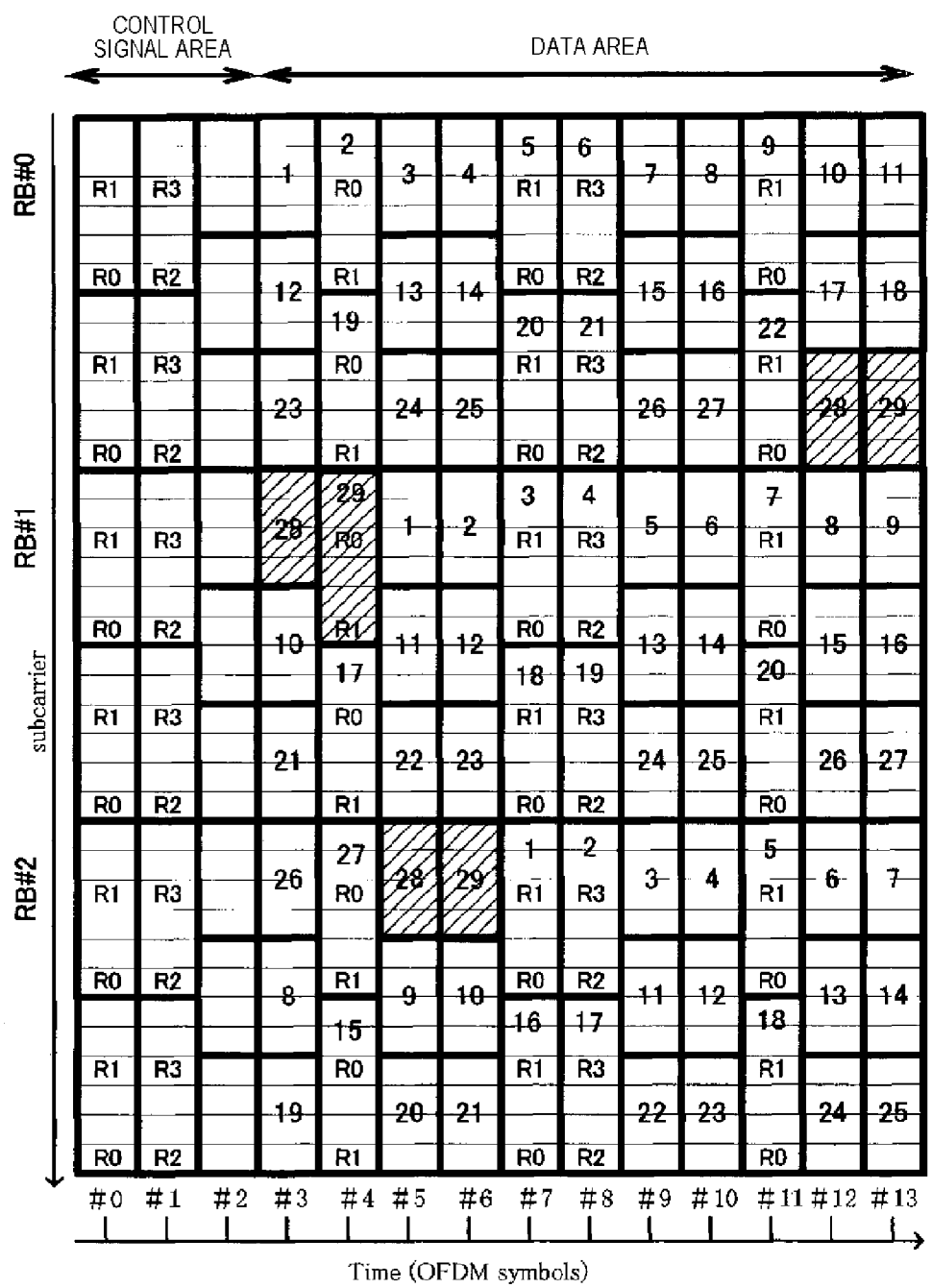
FIG. 3 is a diagram showing an arrangement example 2 of the REGs.

An arrangement example 2 of the REGs#n will be explained with reference to FIG. 3. The configuration of the resource blocks RBs#0 to #2 shown in FIG. 3 is the same as that of the plural resource blocks. RBs#0 to #2 shown in FIG. 2 except for the arrangement of the unused REGs#n and the index of the REG#n where the allocation of the CCE is started. In other words, in FIG. 3, each of the resource blocks RBs#n has two unused REGs#n to each of which the CCE for mapping the control signal R-PDCCH for the relay station is not allocated. In FIG. 3, each of the blocks of the unused REGs#n is represented by slanted lines. The CCE for mapping the control signal R-PDCCH for the relay station is not allocated to the unused REGs#n.

In the arrangement example 2 of the REGs#n, the base station 100 cyclically shifts the index of the REG#n where the allocation of the CCE is started. To this end, the index of the REG#n where the allocation of the CCE is started is determined based on the following (expression 2). The (expression 2) is the information commonly possessed by the base station 100 and the relay station 300, and each of the base station 100 and the relay station 300 performs the calculation commonly.

[Numeral 2]

$$(\text{RB No.}) \bmod (\text{number of REGs per 1 RB}) * \text{remaining number of REGs} \quad (\text{expression 2})$$

The RB No. represents the No. n of the resource block RB#n. Further, the number of REGs per 1 RB represents the number of the REGs#n usable in each of the resource blocks The remaining number of the REGs represents the number of the unused REGs#n in each of the resource blocks RBs#n.

For example, when 2, 29 and 2 are assigned to the RB No., the (number of REGs per 1 RB) and the remaining number of REGs in the (expression 2), respectively, the shift amount of the index of the REG#n where the allocation of the CCE is started is obtained as (2 mod 29)*2=4. Thus, if the REG#1 where the allocation of the CCE in the resource block RB#0 is started is determined as the reference in FIG. 3, the allocation of the CCE is started so that the start position of the index of the REG#n in the resource block RB#2 is the REG#1 which is cyclically shifted by 4 from the position of the REG#26 corresponding to the REG#1 where the allocation of the CCE in the resource block RB#0 is started.

When the start position of the index of the REG#n in the resource block RB#2 is set in the aforesaid manner, the arrangement example of the REGs#n shown in FIG. 3 is same in the positions of the unused REGs#n but differs in the indexes of the REGs#n as compared with the arrangement example 1 of the REGs#n shown in FIG. 2.

Arrangement Example 3 of REGS#n>

Figure 4:
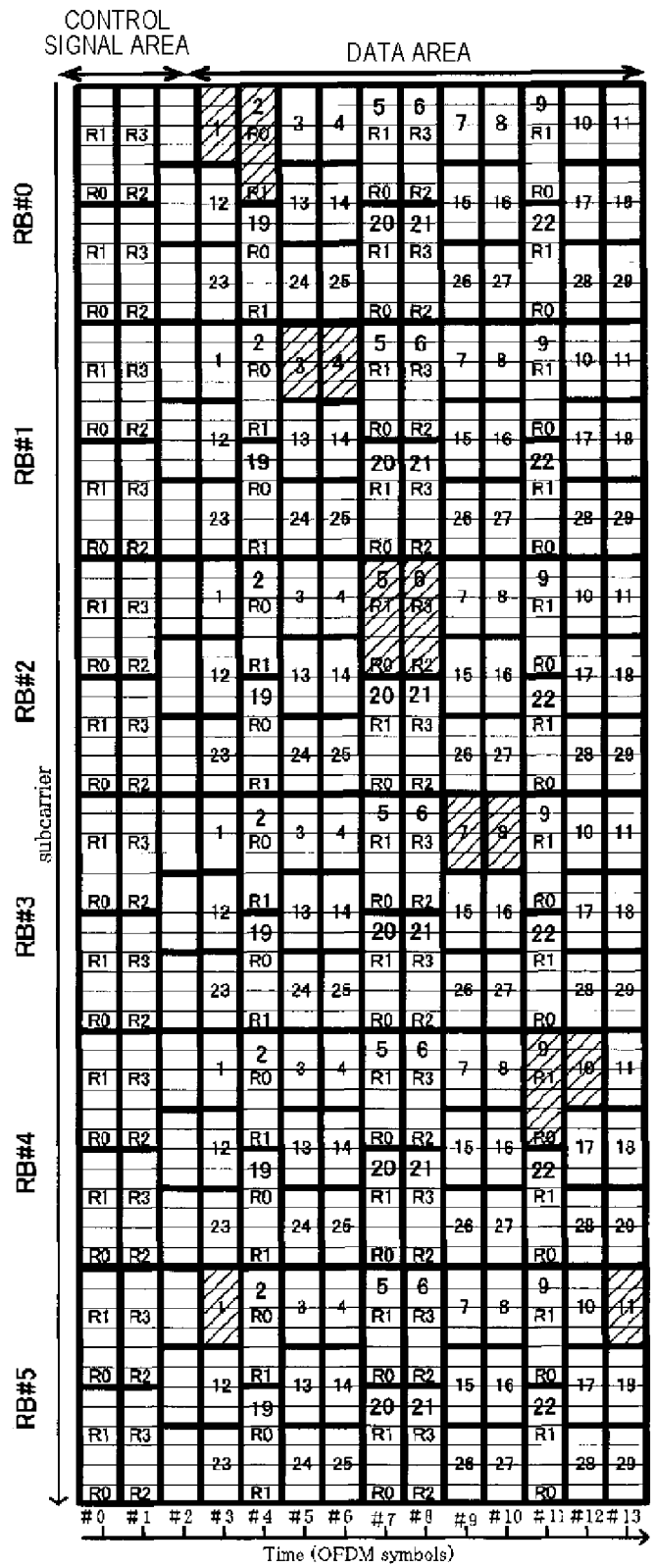
FIG. 4 is a diagram showing an arrangement example 3 of the REGs.

An arrangement example 3 of the REGs will be explained with reference to FIG. 4. The configuration of the resource blocks RBs#0 to #5 shown in FIG. 4 is the same as that of the plural resource blocks RBs#0 to #5 shown in FIG. 2 except for the arrangement of the unused REGs#n. In other words, in FIG. 4, each of the resource blocks RBs#n has two unused REGs#n to each of which the CCE for mapping the control signal R-PDCCH for the relay station is not allocated. In FIG. 4, each of the blocks of the unused REGs#n is represented by slanted lines. The CCE for mapping the control signal R-PDCCH for the relay station is not allocated to the unused REGs#n.

In the arrangement example 3 of the REGs#n, the base station 100 cyclically shifts the unused REGs#n only in the REGs#n containing the designated subcarriers. The data area of one resource block RB is configured by 11 subcarriers. In the arrangement example 3 of the REGs#n, it is supposed that the initial subcarrier within the resource block RB is contained.

In FIG. 4, the indexes of the REGs#n including the initial subcarriers are #1, #2, #3, #4, #5, #6, #7, #8, #9, #10 and #11. Thus, the base station 100 allocates the unused REGs#n to the REG#1, REG#2, REG#3, REG#4, REG#5, REG#6, REG#7, REG#8, REG#9, REG#10 and REG#11.

Then, the shift amount S1 of the unused REG#n is determined based on the following (expression 3). The (expression 3) is the information commonly possessed by the base station 100 and the relay station 300, and each of the base station 100 and the relay station 300 performs the calculation commonly.

[Numeral 3]

$$(\text{RB No.}) \bmod (\text{number of REGs each containing initial subcarrier}) * \text{remaining number of REGs} \quad (\text{expression 3})$$

The RB No. represents the No. n of the resource block RB#n. Further, the number of REGs each containing the initial subcarrier represents the number of the REGs each containing the initial subcarrier in each of the resource blocks RBs#n. The remaining number of the REGs represents the number of the unused REGs#n in each of the resource blocks RBs#n.

For example, when 2, 11 and 2 are assigned to the RB No., the number of REGs each containing the initial subcarrier and the remaining number of REGs in the (expression 3), respectively, the shift amount S1 of the unused REG#n is obtained as (2 mod 11)*2=4. Thus, if the unused REGs#1, #2 of the resource block RB#0 are determined as the references in FIG. 4, the unused REGs#n in the resource block RB#2 are determined as the REGs#5, #6 obtained by cyclically shifting by 4 within the REGs#1 to #11 each containing the initial subcarrier.

When the unused REGs#n are cyclically shifted only within the REGs#n each containing the designated subcarrier, the probability that the OFDM symbols contained in the unused REGs#n are selected becomes constant. When the probability that the OFDM symbols not being used are selected becomes constant, the power can be utilized more effectively since the average transmission power of the respective OFDM symbols can be reduced.

Arrangement Example 4 of REGS#n>

Figure 5:
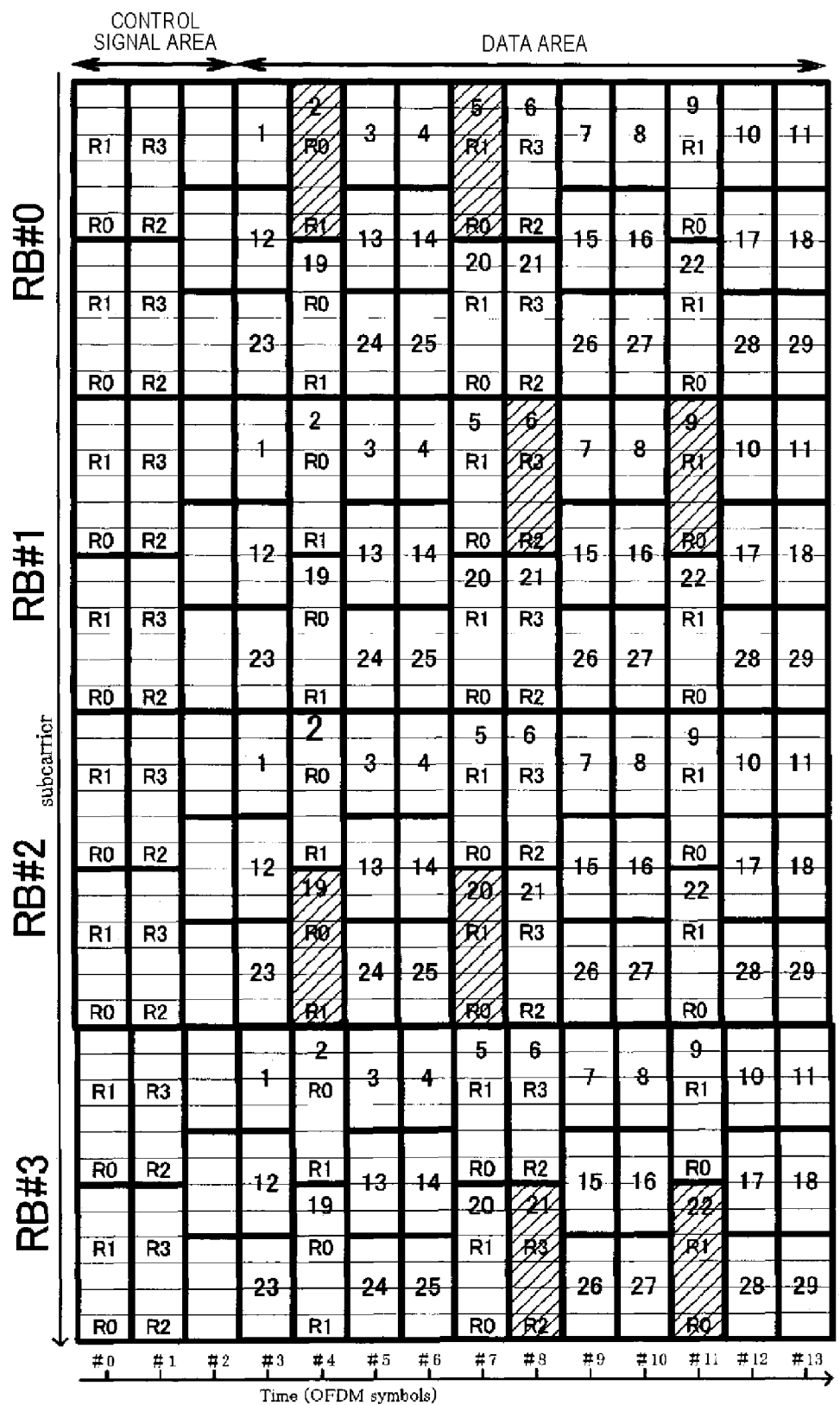
FIG. 5 is a diagram showing an arrangement example 4 of the REGs.

An arrangement example 4 of the REGs#n will be explained with reference to FIG. 5. The configuration of the resource blocks RBs#0 to #3 shown in FIG. 5 is the same as that of the plural resource blocks RBs#0 to #3 shown in FIG. 2 except for the arrangement of the unused REGs#n. In other words, in FIG. 5, each of the resource blocks RBs#n has two unused REGs#n to each of which the CCE for mapping the control signal R-PDCCH for the relay station is not allocated. In FIG. 5, each of the blocks of the unused REGs#n is represented by slanted lines. The CCE for mapping the control signal R-PDCCH for the relay station is not allocated to the "unused REGs#n".

In the arrangement example 4 of the REGs#n, the base station 100 arranges the unused REGs#n only in the OFDM symbols where the RSs#n are arranged.

In FIG. 5, the indexes of the REGs#n including the RSs are #2, #5, #6, #9, #19, #20, #21 and #22. Thus, the base station 100 allocates the unused REGs#n to the REG#2, REG#5, REG#6, REG#9, REG#19, REG#20, REG#21 and REG#22.

Then, the shift amount S2 of the unused REG#n is determined based on the following (expression 4). The (expression 4) is the information commonly possessed by the base station 100 and the relay station 300, and each of the base station 100 and the relay station 300 performs the calculation commonly.

[Numeral 4]

(RB No.)mod(number of REGs containing RSs)*remaining number of REGs    (expression 4)

The RB No. represents the No. n of the resource block RB#n. Further, the number of REGs containing RSs represents the number of the REGs containing the RSs in each of the resource blocks RBs#n. The remaining number of the REGs represents the number of the unused REGs#n in each of the resource blocks RBs#n.

For example, when 2, 8 and 2 are assigned to the RB No., the number of REGs containing the RSs and the remaining number of REGs in the (expression 4), respectively, the shift amount S2 of the unused REG#n is obtained as (2 mod 8)*2=4.

Thus, if the unused REGs#2, #5 of the resource block RB#0 are determined as the references in FIG. 5, the unused REGs#n in the resource block RB#2 are determined as the REGs#19 and #20 obtained by cyclically shifting by 4 within the REG#2, REG#5, REG#6, REG#9, REG#19, REG#20, REG#21, REG#22 each containing the RSs.

As described above, in the arrangement example 4 of the REGs#n shown in FIG. 5, since the base station 100 can use the transmission power not used as the R-PDCCH for the transmission power of the RSs, the transmission power of the RSs can be improved.

Arrangement Example 5 of REGS#n>

Figure 6:
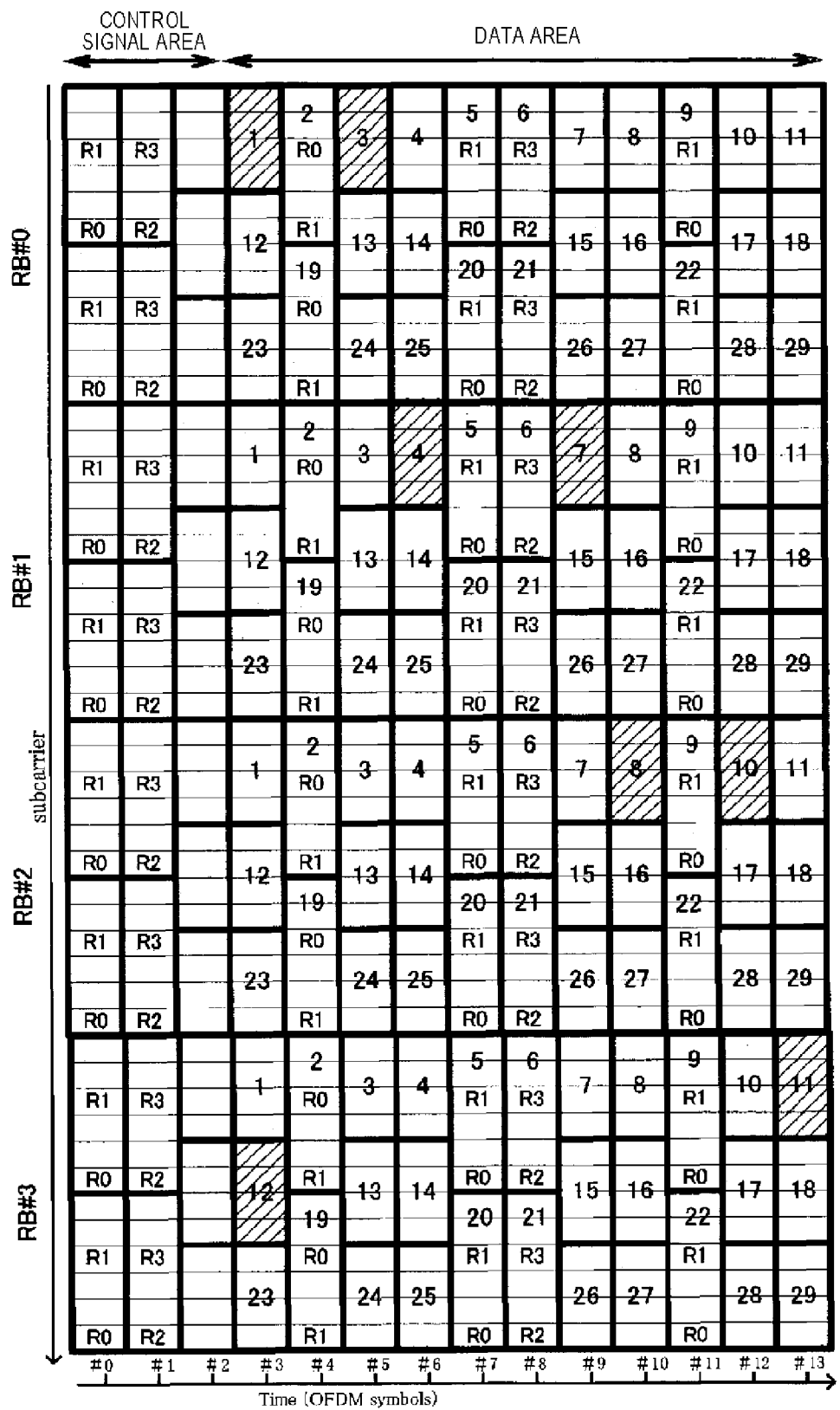
FIG. 6 is a diagram showing an arrangement example 5 of the REGs.

An arrangement example 5 of the REGs#n will be explained with reference to FIG. 6. The configuration of the resource blocks RBs#0 to #3 shown in FIG. 6 is the same as that of the plural resource blocks RBs#0 to #3 shown in FIG. 2 except for the arrangement of the unused REGs#n. In other words, in FIG. 6, each of the resource blocks RBs#n has two unused REGs#n to each of which the CCE for mapping the control signal R-PDCCH for the relay station is not allocated. In FIG. 6, each of the blocks of the unused REGs#n is represented by slanted lines. The CCE for mapping the control signal R-PDCCH for the relay station is not allocated to the unused REGs#n.

In the arrangement example 5 of the REGs#n, the base station 100 arranges the unused REGs#n only in the OFDM symbols where the RS is not arranged.

In the arrangement example 5 of the REGs#n shown in FIG. 6, the indexes of the REGs#n including the RSs are #2, #5, #6, #9, #19, #20, #21 and #22. Thus, the base station 100 allocates the unused REGs#n to the REGs#n other than the REG#2, REG#5, REG#6, REG#9, REG#19, REG#20, REG#21 and REG#22.

Then, the shift amount S3 of the unused REG#n is determined based on the following (expression 5). The (expression 5) is the information commonly possessed by the base station 100 and the relay station 300, and each of the base station 100 and the relay station 300 performs the calculation commonly.

[Numeral 5]

(RB No.)mod(number of REGs not containing RS)*remaining number of REGs    (expression 5)

The RB No. represents the No. n of the resource block RB#n. Further, the number of REGs not containing RS represents the number of the REGs not containing the RS in each of the resource blocks RBs#n. The remaining number of the REGs represents the number of the unused REGs#n in each of the resource blocks RBs#n.

For example, when 2, 21 and 2 are assigned to the RB No., the number of REGs not containing the RS and the remaining number of REGs in the (expression 5), respectively, the shift amount S3 of the unused REG#n is obtained as (2 mod 21)*2=4.

Thus, if the unused REGs#1, #3 of the resource block RB#0 are determined as the references in FIG. 6, the unused REGs#n in the resource block RB#2 are determined as the REGs#8 and #10 obtained by cyclically shifting by 4 only within the REGs#n each not containing the RS.

As described above, in the arrangement example 5 of the REGs#n shown in FIG. 6, in the case where the transmission power of the RSs can be set to a low value, the base station 100 can secure the transmission power by setting the transmission power of the RSs to a low value in the OFDM symbol containing the RS. Further, the transmission power can be secured by not using as the R-PDCCH in the OFDM symbol not containing the RS. Thus, the transmission power of the PDSCH can be improved.

[Configuration of Base Station 100]

Figure 7:
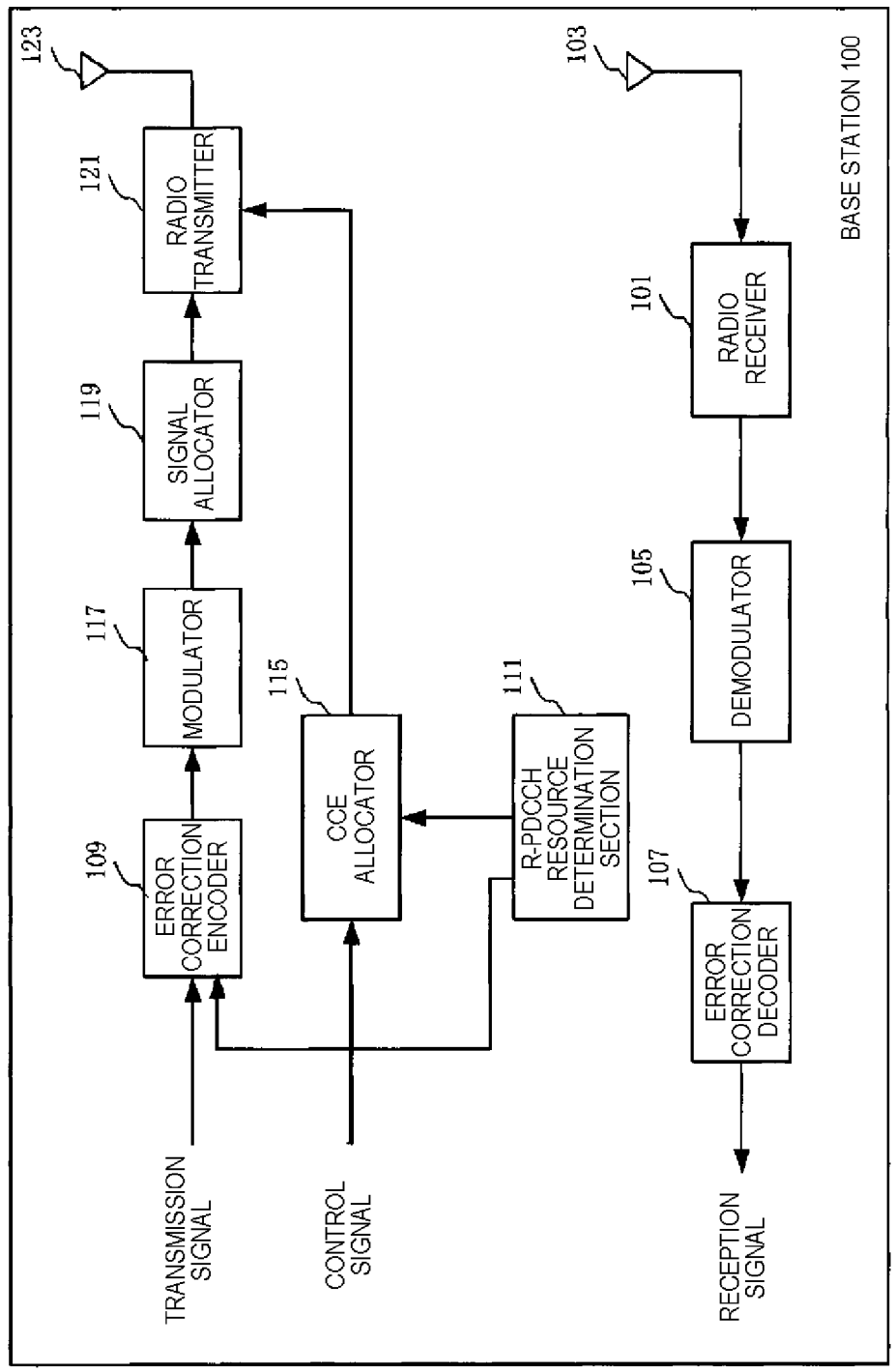
FIG. 7 is a block diagram showing the configuration of a base station 100.

Next, the configuration of the base station 100 will be explained with reference to FIG. 7. FIG. 7 is a block diagram showing the configuration of the base station 100.

The base station 100 shown in FIG. 7 includes a radio receiver 101, a reception antenna 103, a demodulator 105, an error correction decoder 107, an error correction encoder 109, an R-PDCCH resource determination section 111, a CCE allocator 115, a modulator 117, a signal allocator 119, a radio transmitter 121 and a transmission antenna 123.

The radio receiver 101 receives a signal from the relay station 300 or the terminal 500 via the reception antenna 103, then performs a radio processing such as the down-conversion and outputs to the demodulator 105.

The demodulator 105 demodulates the signal and outputs the signal to the error correction decoder 107.

The error correction decoder 107 decodes the signal and outputs a reception signal.

The error correction encoder 109 receives a transmission signal and resource allocation information for the R-PDCCH inputted from the R-PDCCH resource determination section 111, then performs error correction encoding on the transmission signal and outputs the signal to the modulator 117.

The R-PDCCH resource determination section 111 determines the resource for transmitting the control signal for the relay station and outputs a signal for instructing the resource to the CCE allocator 115 and the error correction encoder 109.

The CCE allocator 115 receives the control signal. The control signal for the relay station determines the allocation of the CCE from the resource information for the R-PDCCH. Then, the CCE-allocated signal is outputted to the radio transmitter 121. In this case, the unused REGs#n of the R-PDCCH resource are arranged in a dispersed manner at every resource block RB#n as explained in the arrangement examples 1 to 5 of the REGs#n. Further, as explained above with reference to the (expression 1) to (expression 5), the arrangement rule is shared between the base station 100 and the relay station 300.

The modulator 117 modulates the signal and outputs the signal to the signal allocator 119.

The signal allocator 119 allocates the signal to the resource and outputs the signal to the radio transmitter 121.

The radio transmitter 121 performs a radio processing such as up-conversion on the allocated signal and transmits the signal to the relay station 300 via the transmission antenna 123.

[Configuration of Relay Station 300]

Figure 8:
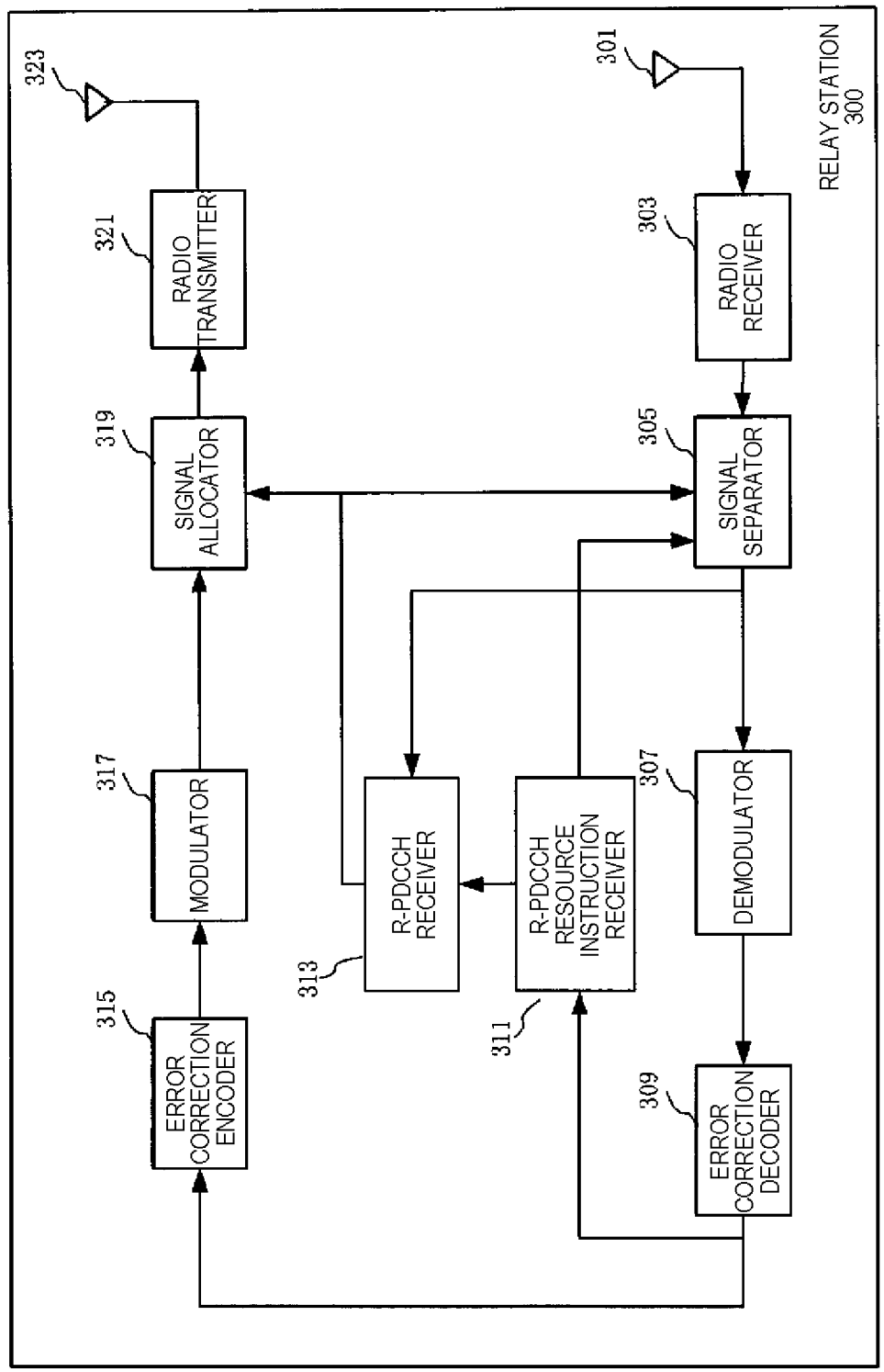
FIG. 8 is a block diagram showing the configuration of a relay station 300.

Next, the configuration of the relay station 300 will be explained with reference to FIG. 8. FIG. 8 is a block diagram showing the configuration of the relay station 300.

The relay station 300 shown in FIG. 8 includes a reception antenna 301, a radio receiver 303, a signal separator 305, a demodulator 307, an error correction decoder 309, an R-PDCCH resource instruction receiver 311, an R-PDCCH receiver 313, an error correction encoder 315, a modulator 317, a signal allocator 319, a radio transmitter 321 and a transmission antenna 323.

The radio receiver 303 receives a signal from the base station 100 or the terminal 500 via the reception antenna 301, then performs a radio processing such as the down-conversion on the signal and outputs the signal to the signal separator 305.

The signal separator 305 separates the resource for the R-PDCCH from the R-PDCCH resource information received from the base station 100 and outputs the result to the R-PDCCH resource instruction receiver 311. Further, the signal separator 305 separates the data resource for the relay station instructed from the R-PDCCH resource instruction receiver 311 from the signal received from the base station 100 and outputs the data resource to the demodulator 307.

The demodulator 307 demodulates the signal and outputs the signal to the error correction decoder 309.

The error correction decoder 309 decodes the signal and outputs the received signal to the R-PDCCH resource instruction receiver 311 and the error correction encoder 315.

The R-PDCCH resource instruction receiver 311 extracts the signal instructing the resource for the R-PDCCH from the signal on which the error correction encoding is performed which is received from the base station 100. Then, the R-PDCCH resource instruction receiver 311 outputs the resource information for the R-PDCCH to the R-PDCCH receiver 313 and the signal separator 305.

The R-PDCCH receiver 313 recognizes the REGs#n not used for the CCE allocation, that is, unused REGs#n from the resources instructed from the base station 100 based on the resource information for the R-PDCCH and receives the R-PDCCH. Further, the R-PDCCH receiver 313 outputs scheduling information of a downlink (hereinafter called DL) to the signal separator 305 and outputs scheduling information of an uplink (hereinafter called UL) to the signal allocator 319.

The error correction encoder 315 inputs the signal on which the error correction encoding has been performed which is received from the base station 100, then performs the error correction encoding on the transmission signal and outputs the signal to the modulator 317.

The modulator 317 modulates the transmission signal on which the error correction encoding is performed and outputs the signal to the signal allocator 319.

The signal allocator 319 allocates the signal in accordance with the scheduling information of the uplink (UL) outputted from the R-PDCCH receiver 313 and outputs the signal to the radio transmitter 321.

The radio transmitter 321 subjects the allocated signal to a radio processing such as the up-conversion and transmits to the base station 100 via the transmission antenna 323.

[Operation of Relay Station 300]

Figure 9:
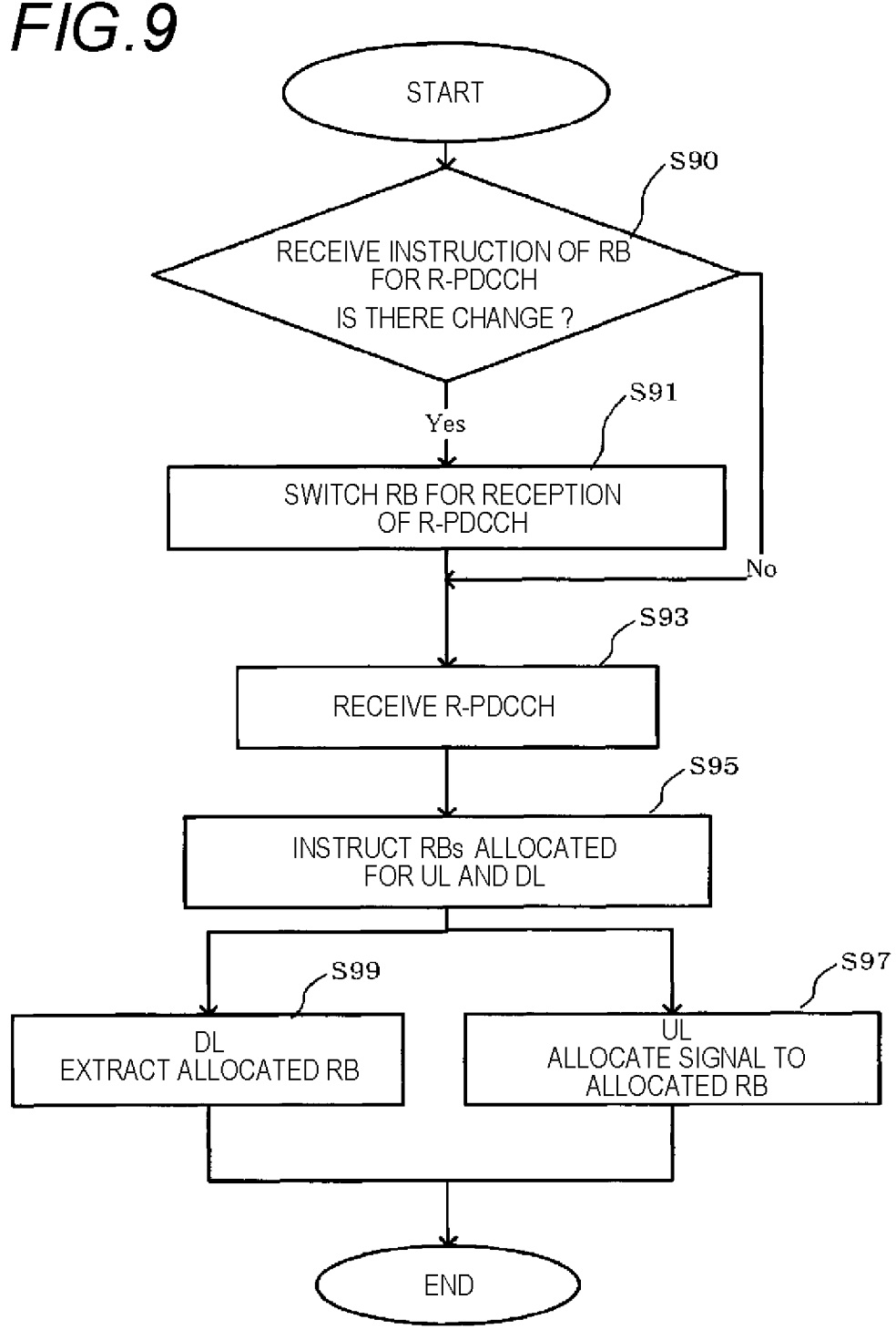
FIG. 9 is a diagram showing the operation flow of the relay station 300.

Next, the operation of the relay station 300 will be explained with reference to FIG. 9. FIG. 9 is a diagram showing the operation flow of the relay station 300. The flow of the operation where the relay station 300 receives and processes the control signal is shown as the flow diagram.

In step S90, the relay station 300 receives the instruction of the resource block RB for the R-PDCCH. When there is a change, the process proceeds to step S91. When there is no change, the process proceeds to step S93. When the instruction signal is transmitted as the control signal of a higher rank, the update is performed with a frequency of several frame-unit basis. When the instruction signal is transmitted by setting the control signal inserted at every subframe (for example, R-PCFICH), it is possible to change at every subframe. In the relay station 300 of this embodiment, there is shown a case that the instruction signal is transmitted as the control signal of the higher rank. The control signal may be transmitted only when there is a change.

In step S91, the signal separator 305 switches the RB for the reception of the R-PDCCH and the process proceeds to step S93.

In step S93, the signal separator 305 extracts the signal of the designated resource block RB and the R-PDCCH receiver 313 receives the R-PDCCH. The, the process proceeds to step S95.

In step S95, the RB information allocated for the UL and the RB information allocated for the DL are obtained from the R-PDCCH, then the scheduling information of the UL is outputted to the signal allocator 319 and the scheduling information of the DL is outputted to the signal separator 305.

In step S97, the signal allocator 319 allocates the signal of the UL to the RB based on the scheduling information of the UL. Then the operation is completed.

In step S99, the signal separator extracts the signal of the RB allocated to the DL and outputs the signal to the demodulator. Then the operation is completed.

In this embodiment, in each of the (expression 1) to (expression 5), although the RB Nos. of the resource blocks RBs are explained as the series numbers over the entire band where the service is provided, the RB Nos. may be the numbers allocated to the R-PDCCH. Alternatively, the RB Nos. may be the numbers of the RBG (Resource Block Group) used as the allocation unit.

Figure 10:
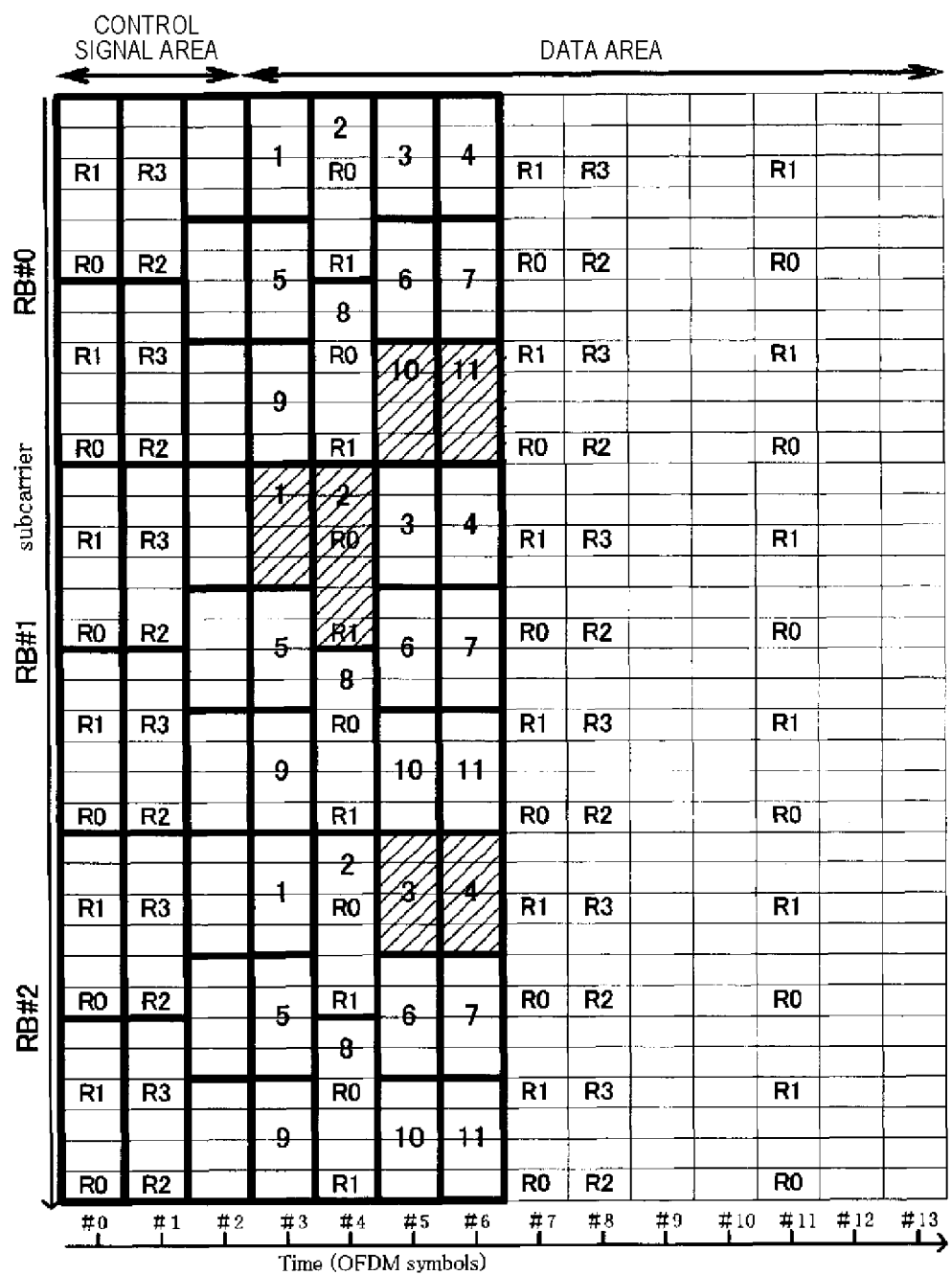
FIG. 10 is a diagram showing an example of the allocation of OFDM symbols used in R-PDCCH.

In this embodiment, the OFDM symbols used for the R-PDCCH are not limited to the aforesaid example. For example, as shown in FIG. 10, it is possible to apply this embodiment to a system where the OFDM symbols are allocated to 4-symbol R-PDCCH.

In this embodiment, although the R-PDCCH is allocated to the continuous RBs in the arrangement examples of the REGs#n shown in FIGS. 2 to 6, the RBs where the R-PDCCH is arranged is not required to be continuous.

Further, in this embodiment, concerning the allocation method of the REGs#n for the R-PDCCH, although the explanation is made as to the example where the REs constituting the REGs#n belong to the same OFDM symbol, it is not limited thereto. The REs constituting the REGs#n may contain the same subcarriers of the different OFDM symbols.

Figure 11:
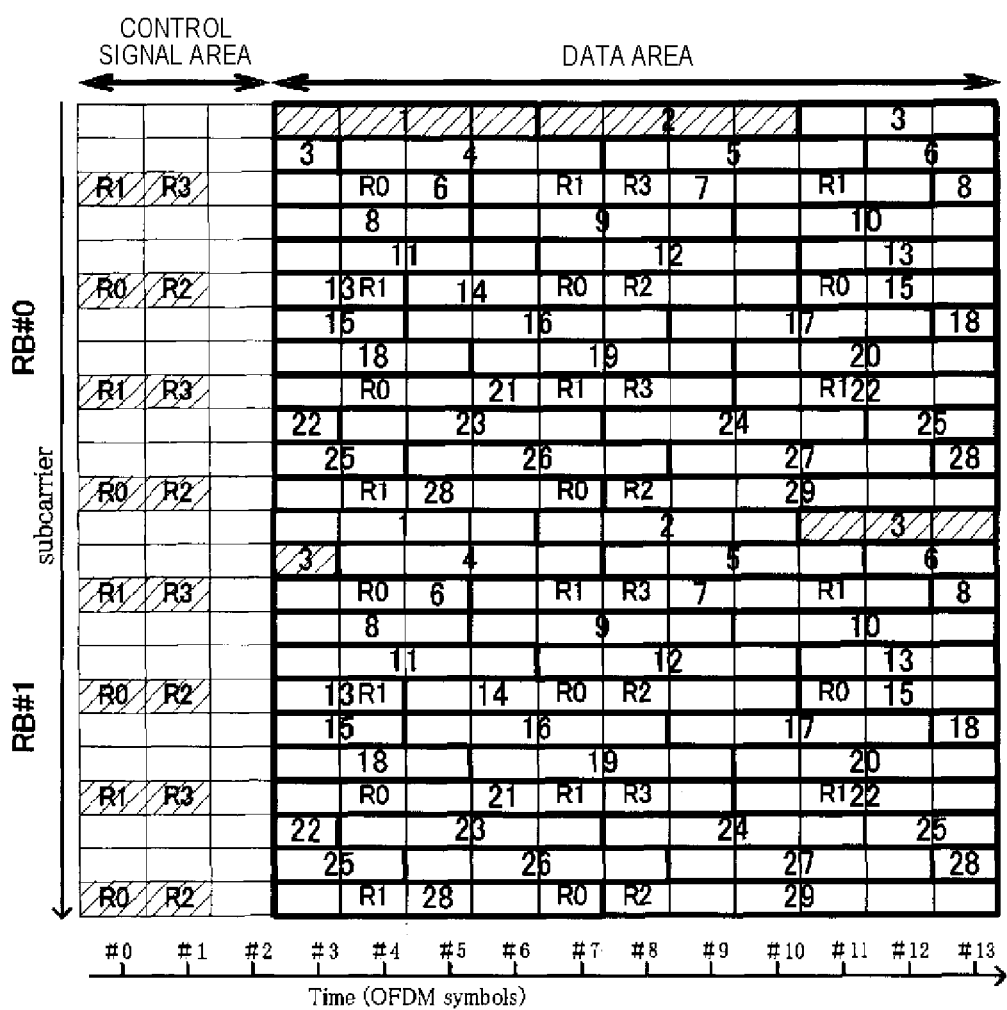
FIG. 11 is a diagram showing an example where the OFDM symbols differ among all REs constituting the REGs.

FIG. 11 shows an example that the OFDM symbols of all the REs constituting the REGs#n differ. As shown in FIG. 11, the OFDM symbols of the REs constituting the REGs#n are the OFDM symbol #3 to #13, that is, different from one another. In this case, it is possible to apply each of the aforesaid arrangement examples 1, 2 and 4 of the REGs#n.

Modified Example

In the first embodiment, although the CCEs for the relay station are allocated on the single resource block RB basis as 1 unit, it is investigated that the CCEs for the relay station are allocated on the plural resource blocks RBs basis as 1 unit. Thus, the explanation will be made as to a case where the allocation of the R-PDCCH is preformed over the plural resource blocks RBs as the modified example of the first embodiment.

Figure 12:
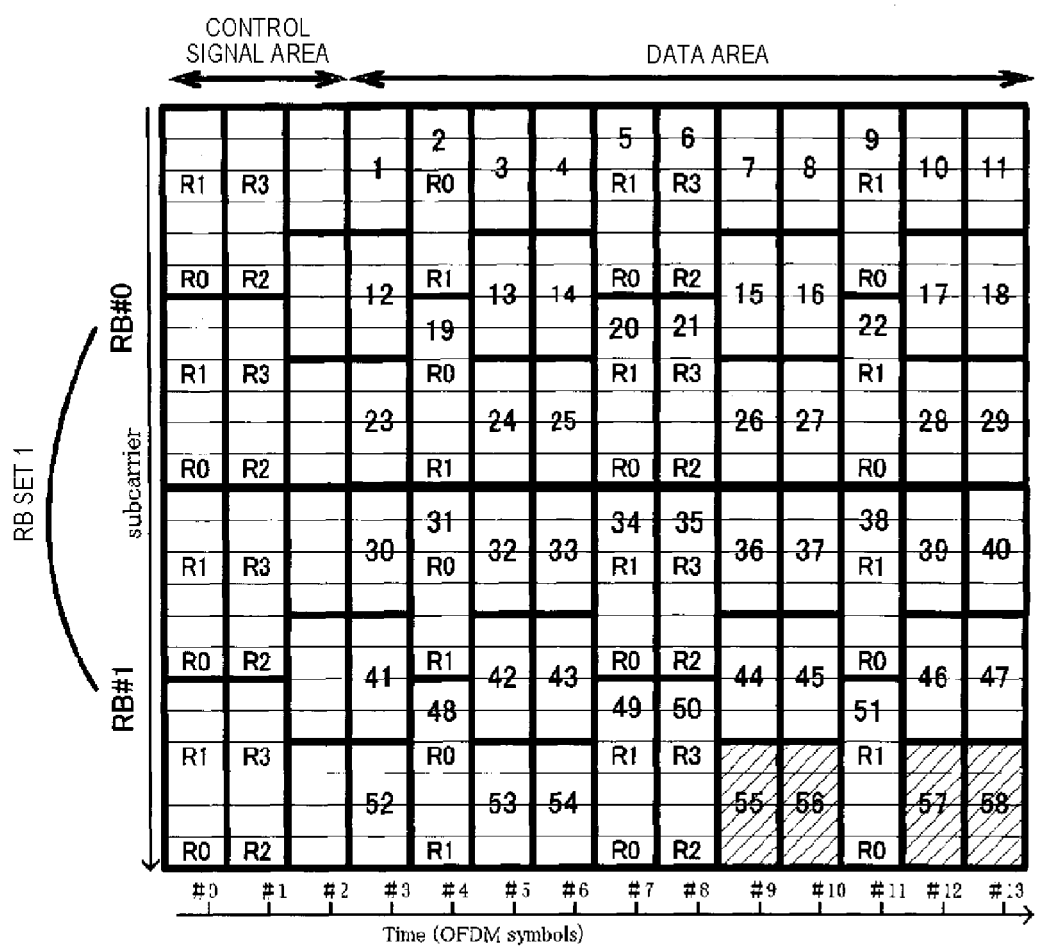
FIG. 12 is a diagram showing an arrangement example of the REGs in a case of using 2 resource blocks RBs.

As an example, the explanation will be made with reference to FIG. 12 as to a case where the base station 100 allocates the CCEs for the relay station by using 2 resource blocks RBs. FIG. 12 is a diagram for explaining the arrangement example of the REGs#n in the case where the base station 100 allocates the CCEs for the relay station by using the two resource blocks RBs. The method of allocating the REGs#n is the same as the case of the resource blocks shown in FIG. 17.

In the two resource blocks RBs shown in FIG. 12, the base station 100 can use 232 REs for the R-PDCCH. The number of the REGs#n is 58 (232/4), the number of the CCEs is 6 (58/9=6, remainder: 4), and the number of the unused REGs#n is 4. As in the LTE, when the REGs#n used for the PDCCH are sequentially numbered in the order of one having a smaller subcarrier No. of the RE belonging to the REG#n and having a smaller OFDM symbol, the unused REGs#n are the REG#55 to REG#58.

As shown in FIG. 12, the unused REGs#n locate in an unbalanced manner also in the case where the R-PDCCH is allocated over the plural resource blocks RBs. Thus, as in the first embodiment, the base station 100 arranges the unused REGs#n in a dispersed manner also in the case where the allocation is performed over the plural resource blocks RBs in the modified example 1, to thereby improve the utilization efficiency of the power. Hereinafter, the explanation will be made as to arrangement examples 6 and 7 of the REGs#n in each of which the unused REGs#n are arranged in a dispersed manner.

Arrangement Example 6 of REGS#n>

Figure 13:
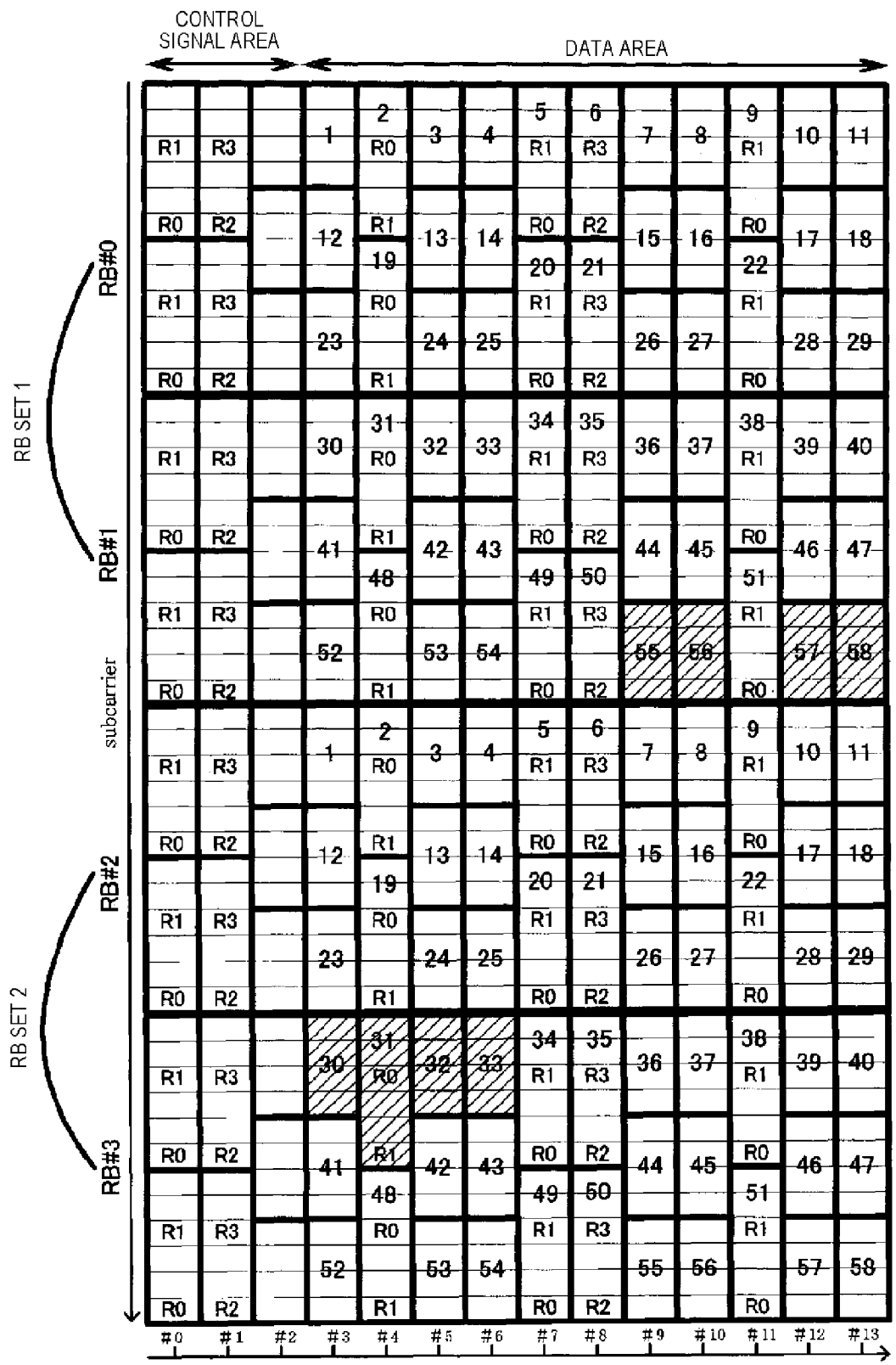
FIG. 13 is a diagram showing an arrangement example 6 of the REGs.

The arrangement example 6 of the REGs#n will be explained with reference to FIG. 13. FIG. 13 is a diagram showing the arrangement example 6 of the REGs#n. In the arrangement example 6 of the REGs#n, there are a set of the RB#0 and the RB#1 and a set of the RB#2 and the RB#3 as two sets of the resource blocks RBs for allocating the CCEs for the relay station.

The configuration of the resource blocks RBs#0 to #3 shown in FIG. 13 is the same as that of the plural resource blocks RBs#0 to #3 shown in FIG. 2 except for the arrangement of the unused REGs#n. That is, in FIG. 13, each of the sets (RB#0, RB#1) and (RB#2, RB#3) of the resource blocks RBs has four unused REGs#n to each of which the CCE for mapping the control signal R-PDCCH for the relay station is not allocated. In FIG. 13, each of the blocks of the unused REGs#n is represented by slanted lines. The CCE for mapping the control signal R-PDCCH for the relay station is not allocated to the unused REGs#n.

First, the shift amount S4 of the unused REG#n is determined based on the following (expression 6). The (expression 6) is the information commonly possessed by the base station 100 and the relay station 300, and each of the base station 100 and the relay station 300 performs the calculation commonly. In the arrangement example 6 of the REGs#n, the unused REGs#n are arranged only in the latter resource block RB in each of the set (RB#0, RB#1) of the resource blocks RBs and the set (RB#2, RB#3) of the resource blocks RBs. That is, the unused REGs#n are arranged in the resource block RB#1 in the set (RB#0, RB#1) of the resource blocks RBs and in the resource block RB#3 in the set (RB#2, RB#3) of the resource blocks RBs.

[Numeral 6]

$$(((RB\ No. - (number\ of\ RBs\ per\ 1\ set-1))*floor(remaining\ number\ of\ REGs./number\ of\ RBs\ per\ 1\ set))\mod(number\ of\ REGs\ per\ 1\ RB)$$ (expression 6)

The RB No. represents the No. n of the resource block RB#n. Further, the number of RBs per 1 set represents the number of the resource blocks #n constituting the set of the resource blocks RBs. The number of the REGs per 1 RB represents the number of the REGs#n per single resource block RB#n. The remaining number of the REGs represents the number of the unused REGs#n in each set of the resource blocks RBs#n.

For example, when 3, 2, 4 and 58 are assigned to the RB No., the number of RBs per 1 set, the remaining number of REGs and the number of REGs per 1 RB in the (expression 6), respectively, the shift amount S4 of the unused REG#n is obtained as $((3-(2-1))*4/2)\mod(58)=4$.

Thus, if the unused REGs#55, #56, #57, #58 of the set (RB#0, RB#1) of the resource blocks RBs are determined as the references in FIG. 13, the positions of the unused REGs#n of the set (RB#2, RB#3) of the resource blocks RBs are cyclically shifted in the REG#30, REG#31, REG#32, REG#33 within the resource block RB#3.

Arrangement example 7 of REGS#n>

Figure 14:
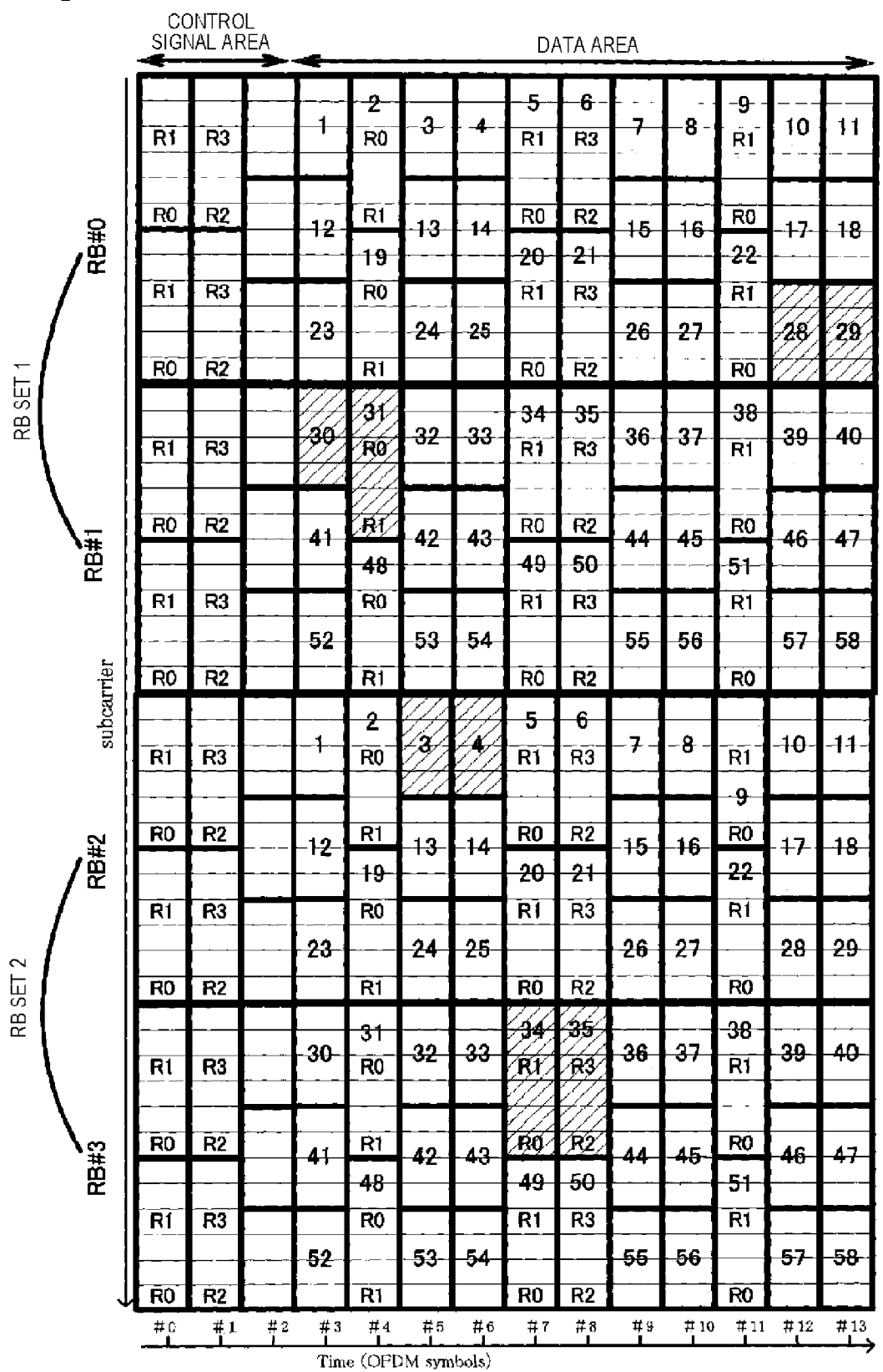
FIG. 14 is a diagram showing an arrangement example 7 of the REGs.
Figure 15:
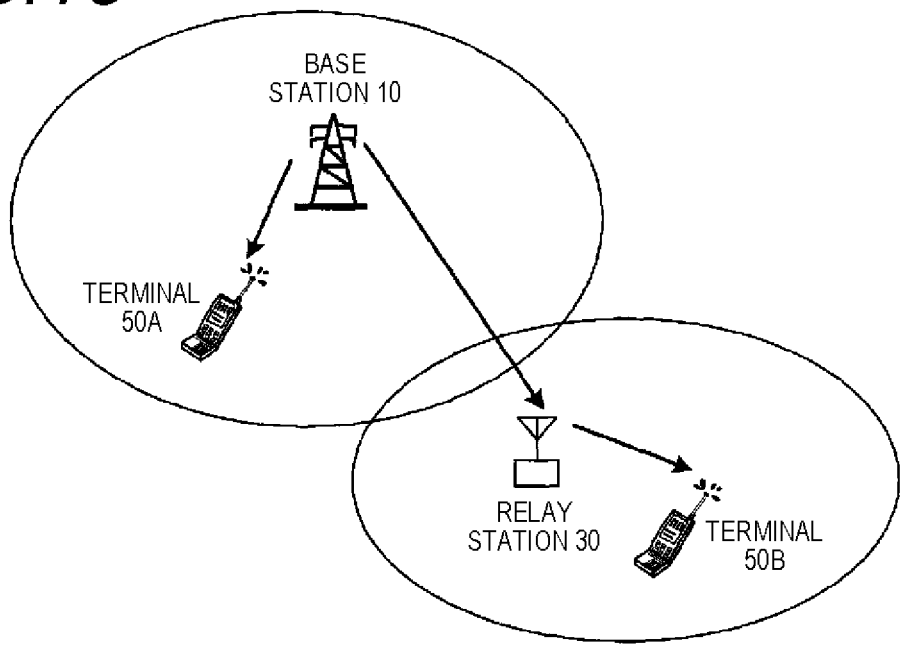
FIG. 15 is a diagram showing a wireless relay system of a related art.
Figure 16:
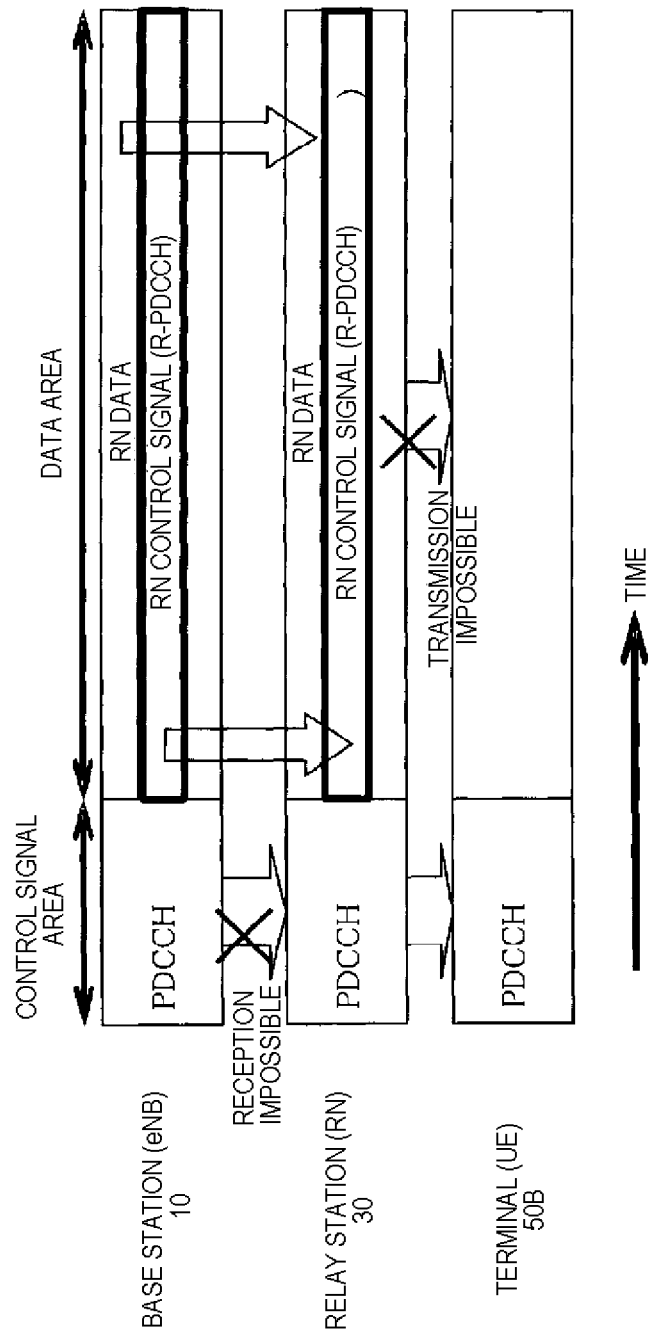
FIG. 16 is a diagram showing an example of the allocation of a control signal and data in a subframe of respective stations of LTE system.

The arrangement example 7 of the REGs#n will be explained with reference to FIG. 14. FIG. 14 is a diagram showing the arrangement example 7 of the REGs#n. In this arrangement example, as in the arrangement example 6 of the REGs#n shown in FIG. 13, there are a set (RB#0, RB#1) of the resource blocks RBs and a set (RB#2, RB#3) of the resource blocks RBs as two sets of the resource blocks RBs for allocating the CCEs for the relay station. Further, in the arrangement example 7 of the REGs#n, the unused REG#n are arranged at each of the resource blocks RBs#0, #1, #2, #3.

The configuration of the resource blocks RBs#0 to #3 shown in FIG. 14 is the same as that of the resource blocks RBs#0 to #3 shown in FIG. 13 except for the arrangement of the unused REGs#n. That is, in FIG. 14, each of the resource blocks RBs#n has two unused REGs#n to each of which the CCE for mapping the control signal R-PDCCH for the relay station is not allocated. In FIG. 14, each of the blocks of the unused REGs#n is represented by slanted lines. The CCE for mapping the control signal R-PDCCH for the relay station is not allocated to the unused REGs#n.

First, the shift amount S5 of the unused REG#n is determined for each of the resource blocks RBs#0, #1, #2, #3 based on the following (expression 7). The (expression 7) is the information commonly possessed by the base station 100 and the relay station 300, and each of the base station 100 and the relay station 300 performs the calculation commonly.

[Numeral 7]

$$(RB\ No.)\mod(number\ of\ REGs\ per\ 1\ RB)*floor(remaining\ number\ of\ REGs/number\ of\ RBs\ per\ 1\ set)$$ (expression 7)

The RB No. represents the No. n of the resource block RB#n. The number of the REGs per 1 RB represents the number of the REGs#n of each of the resource blocks RBs#n constituting the set of the resource blocks RBs. Further, the number of RBs per 1 set represents the number of the resource blocks #n constituting the set of the resource blocks RBs. The remaining number of the REGs represents the number of the unused REGs#n in each set of the resource blocks RBs#n.

For example, when 3, 2, 4 and 58 are assigned to the RB No., the number of RBs per 1 set, the remaining number of REGs and the number of REGs per 1 RB in the (expression 7), respectively, the shift amount S5 of the unused REG#n is obtained as $\{3\mod 29*4/2\}=6$.

Thus, if the unused REGs#28, #29 of the resource blocks RB#0 are determined as the references in FIG. 14, the unused REGs#n in the resource block RB#3 are determined as the REG#34, REG#35.

The arrangement of the arrangement example 7 of the REGs#n shown in FIG. 14 is similar to that of the arrangement example 1 of the first embodiment. Thus, the arrangement of the unused REGs#n can be dispersed even when the number of the RBs to be allocated differs at each of the relay stations.

Further, different offset amounts may be set for the respective cells with respect to the setting of the unused REGs#n in each of the aforesaid embodiments. To be concrete, the calculation of mod is performed after adding an offset amount peculiar to the cell to the RB No. In this case, since different REGs#n can be set to the unused REGs#n among the cells, an interference amount can be reduced.

The respective functional blocks used for explaining each of the aforesaid embodiments can be realized typically as an LSI as an integrated circuit. These blocks may be separately formed as a single chip or may be formed as a single chip so as to include a part or all of these blocks. Although the explanation is made as to the LSI, it may also be called alternatively as an IC, a system LSI, a super LSI or an ultra LSI depending on the integration degree.

The method of the integration is not limited to the LSI and may be realized by a dedicated circuit or a general-purpose processor. Alternatively, an FPGA (Field Programmable Gate Array) capable of programming or a reconfigurable processor capable of reconfiguring the coupling or setting of the circuit cells within the LSI each after fabricating the LSI may be used.

Further, if a technique of the circuit integration in place of the LSI is developed based on another technique according to the progress of or derived from the semiconductor technique, the functional blocks may be integrated by suing such the technique, of course. The biotechniques may be applied as an example.

Although the embodiments are explanation as to a case of using the antenna, an antenna port can be applied in the similar manner. The antenna port represents a logical antenna configured by one or plural physical antennas. That is, the antenna port does not necessarily represent a single physical antenna but may represent an array antenna etc. configured by plural antennas. For example, the LTE does not define the number of the physical antennas constituting the antenna port but define the antenna port as a minimum unit capable of transmitting different reference signals from the base station. Alternatively, the antenna port may be defined as a minimum unit for multiplying the weighting of a precoding vector.

The present application is based on Japanese Patent application (Japanese Patent application No. 2009-230958) filed on Oct. 2, 2009, the content of which is herein incorporated by reference.

INDUSTRIAL APPLICABILITY

The wireless communication apparatus and the wireless communication method according to this invention can use the transmission power effectively by changing the arrangement of the unused REGs, advantageously, and are usable for a wireless communication apparatus etc.

REFERENCE SIGNS LIST 100 base station
101 radio receiver
103 reception antenna
105 demodulator
107 error correction decoder
109 error correction encoder
115 CCE allocator
117 modulator
119 signal allocator
121 radio transmitter
123 transmission antenna
300 relay station
301 reception antenna
303 radio receiver
305 signal separator
307 demodulator
309 error correction decoder
311 R-PDCCH resource instruction receiver
313 R-PDCCH receiver
315 error correction encoder
317 modulator
319 signal allocator
321 radio transmitter
323 transmission antenna
500 terminal

The invention claimed is:

1. A wireless communication apparatus which performs wireless communication with a terminal equipment via a relay station, the wireless communication apparatus comprising: an allocator which is adapted to allocate CCEs in which control signals for the relay station are arranged to a plurality of REGs so that unused REGs not allocated with the CCEs differ among respective resource blocks each having the plurality of REGs, and so that an index of REG for starting an allocation of the CCEs is cyclically shifted at each of the resource blocks, wherein an amount of shift for cyclically shifting the unused REGs is determined in the allocator so as to be a numerical value which is obtained by multiplying a number of the unused REGs by a remainder that is obtained by dividing a No. of the resource block by the number of the REGs of one resource block; and a transmitter which is adapted to transmit the control signal arranged in the CCEs allocated to the REGs to the relay station in accordance with the allocation by the allocator.

2. The wireless communication apparatus according to claim 1, wherein the allocator is adapted to cyclically shift the unused REGs at each of resource block sets when the CCEs are allocated to the resource block sets each configured by at least a part of the resource blocks.

3. The wireless communication apparatus according to claim 1, wherein the allocator is adapted to cyclically shift the unused REGs at each of the resource blocks when the CCEs are allocated to resource block sets each configured by at least a part of the resource blocks.

4. The wireless communication apparatus according to claim 1, wherein
the allocator is adapted to cyclically shift REG containing a determined subcarrier as the unused REGs at each of the resource blocks.

5. A wireless communication method for performing wireless communication with a terminal equipment via a relay station, the wireless communication method comprising the steps of:" allocating CCEs in which control signals for the relay station are arranged to a plurality of REGs so that unused REGs not allocated with the CCEs differ among respective resource blocks each having the plurality of REGs, and so that an index of REG for starting an allocation of the CCEs is cyclically shifted at each of the resource blocks, wherein an amount of shift for cyclically shifting the unused REGs is determined in the allocator so as to be a numerical value which is obtained by multiplying a number of the unused REGs by a remainder that is obtained by dividing a No. of the resource block by the number of the REGs of one resource block; and transmitting the control signal arranged in the CCEs allocated to the REGs to the relay station in accordance with the allocation.

* * * * *